United States Patent
Yang et al.

(10) Patent No.: US 9,137,531 B2
(45) Date of Patent: Sep. 15, 2015

(54) SCANNING METHOD AND DEVICE, AND REVERSE SCANNING METHOD AND DEVICE

(71) Applicant: Huawei Technologies Co., Ltd., Shenzhen (CN)

(72) Inventors: Haitao Yang, Shenzhen (CN); Jiantong Zhou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/847,044

(22) Filed: Mar. 19, 2013

(65) Prior Publication Data

US 2013/0215964 A1 Aug. 22, 2013

Related U.S. Application Data

(63) Continuation of application No. PCT/CN2011/074558, filed on May 24, 2011.

(30) Foreign Application Priority Data

Sep. 30, 2010 (CN) .......................... 2010 1 0505932

(51) Int. Cl.
*H04N 7/26* (2006.01)
*H04N 19/50* (2014.01)
(Continued)

(52) U.S. Cl.
CPC ....... *H04N 19/00569* (2013.01); *H04N 19/129* (2014.11); *H04N 19/157* (2014.11); *H04N 19/176* (2014.11); *H04N 19/61* (2014.11)

(58) Field of Classification Search
CPC .............................................. H04N 19/00109
See application file for complete search history.

(56) References Cited

U.S. PATENT DOCUMENTS 5,959,872 A 9/1999 Son
7,688,894 B2 * 3/2010 Liang et al. .............. 375/240.18
(Continued)

FOREIGN PATENT DOCUMENTS

CN 1489391 A 4/2004
CN 1665301 A 9/2005
(Continued)

OTHER PUBLICATIONS

Communication from a foreign counterpart application, International Application No. PCT/CN2011/074558, English Translation, International Search Report dated Sep. 1, 2011, 3 pages.
(Continued)

*Primary Examiner* — Andy Rao
*Assistant Examiner* — Tyler Edwards
(74) *Attorney, Agent, or Firm* — Conley Rose, P.C.; Grant Rodolph

(57) ABSTRACT

A scanning method and device, and a reverse scanning method and device in coding and decoding technologies are provided. The scanning method includes: receiving quantized transformed coefficients of a current block; obtaining a prediction direction of the current block; finding, according to the prediction direction, a scanning order corresponding to the prediction direction of the current block from a mapping relationship table of the prediction direction and the scanning order, wherein at least one scanning order in the mapping relationship table of the prediction direction and the scanning order corresponds to at least two prediction directions; and performing scanning processing on the coefficients by using the scanning order corresponding to the prediction direction of the current block. With the solutions of the present invention, the number of the scanning orders used in coding and decoding is decreased, and system complexity of a codec system is reduced.

20 Claims, 6 Drawing Sheets

(51) Int. Cl.
*H04N 19/176* (2014.01)
*H04N 19/129* (2014.01)
*H04N 19/61* (2014.01)
*H04N 19/157* (2014.01)

(56) References Cited

U.S. PATENT DOCUMENTS

| | | | |
|---|---|---|---|
| 2003/0128753 A1 | 7/2003 | Lee et al. | |
| 2003/0202594 A1 | 10/2003 | Lainema | |
| 2004/0066974 A1 | 4/2004 | Karczewicz et al. | |
| 2004/0156437 A1 | 8/2004 | Lainema | |
| 2004/0186869 A1 | 9/2004 | Natsume | |
| 2006/0002466 A1 | 1/2006 | Park | |
| 2006/0146936 A1 | 7/2006 | Srinivasan | |
| 2007/0036224 A1 | 2/2007 | Srinivasan et al. | |
| 2008/0310504 A1 | 12/2008 | Ye et al. | |
| 2008/0310512 A1* | 12/2008 | Ye et al. | 375/240.16 |
| 2008/0310745 A1 | 12/2008 | Ye et al. | |
| 2009/0087110 A1* | 4/2009 | Tourapis et al. | 382/238 |
| 2009/0116759 A1 | 5/2009 | Suzuki et al. | |
| 2010/0246687 A1 | 9/2010 | Yoshimatsu | |
| 2011/0090967 A1 | 4/2011 | Chen et al. | |
| 2012/0263238 A1 | 10/2012 | Miyoshi et al. | |
| 2013/0070843 A1 | 3/2013 | Srinivasan | |
| 2013/0266068 A1 | 10/2013 | Seo | |

FOREIGN PATENT DOCUMENTS

| | | |
|---|---|---|
| CN | 1705375 A | 12/2005 |
| CN | 1798341 A | 7/2006 |
| CN | 101543079 A | 9/2009 |
| CN | 101682771 A | 3/2010 |
| CN | 101803386 A | 8/2010 |
| EP | 1887804 A2 | 2/2008 |
| EP | 2182732 A1 | 5/2010 |
| JP | 04015770 A | 1/1992 |
| JP | 2001117909 A | 4/2001 |
| JP | 2003250157 A | 9/2003 |
| JP | 2009027541 A | 2/2009 |
| JP | 2009513056 A | 3/2009 |
| KR | 1020040091746 A | 10/2004 |
| KR | 100772576 B1 | 11/2007 |
| KR | 20080042816 A | 5/2008 |
| KR | 20090129939 A | 12/2009 |
| RU | 2330325 C2 | 7/2008 |
| RU | 2391794 C2 | 6/2010 |
| WO | 2007046644 A1 | 4/2007 |
| WO | 2008020672 A1 | 2/2008 |
| WO | 2011080806 A1 | 7/2011 |

OTHER PUBLICATIONS

Jia, J., et al., "Adaptive Transform Coefficient Scan for H.264 Intra Coding", IEICE—Transactions on Information and Systems, vol. E90-D, Issue 10, Oct. 2007, pp. 1709-1711.
Foreign Communication From a Counterpart Application, PCT Application PCT/CN2011/074558, English Translation of Written Opinion dated Sep. 1, 2011, 4 pages.
Foreign Communication From a Counterpart Application, Chinese Application 201010505932.3, Chinese Office Action dated Mar. 4, 2013, 7 pages.
Foreign Communication From a Counterpart Application, Chinese Application 201010505932.3, Partial English Translation of Chinese Office Action dated Mar. 4, 2013, 5 pages.
Dae-Yeon, K., et al., "Enhanced Intra Coding," ITU—Telecommunications Standardization Sector, Study Group 16, Question 6, Video Coding Experts Group (VCEG), VCEG-AH11, 34th Meeting: Antalya, Turkey, Jan. 12-13, 2008, 6 pages.
Chul-Woo, K., et al., "Verification of Adaptive Double Scan on Common Conditions," ITU—Telecommunications Standardization Sector, Study Group 16, Question 6, VCEG-036, 15th Meeting: Pattaya, Thailand, Dec. 4-6, 2001, 3 pages.
Byeong-Doo, C., et al., "Adaptive Coefficient Scanning Based on the Intra Prediction Mode," ETRI Journal, vol. 29, No. 5, Oct. 2007, pp. 694-696, and 5-10.
Foreign Communication From a Counterpart Application, Japanese Application No. 2013-530537, Japanese Office Action dated Feb. 12, 2014, 7 pages.
Foreign Communication From a Counterpart Application, Japanese Application No. 2013-530537, English Translation of Japanese Office Action dated Feb. 12, 2014, 7 pages.
Foreign Communication From a Counterpart Application, Korean Application No. 10-2013-7007157, Korean Office Action dated Mar. 17, 2014, 5 pages.
Foreign Communication From a Counterpart Application, Korean Application No. 10-2013-7007157, English Translation of Korean Office Action dated Mar. 17, 2014, 3 pages.
Foreign Communication From a Counterpart Application, European Application No. 11777233.5, Extended European Search Report dated Jul. 25, 2013, 8 pages.
Puri, A., et al., "Improvements in DCT Based Video Coding," Proceedings of SPIE, International Society for Optical Engineering, AT&T Labs, XP000199866, SPIE vol. 3024, No. Part 1, Feb. 12, 1997, pp. 676-688.
Wei, Y., et al., "Adaptive Mode-Dependent Scan for H.264/AVC Intracoding," SPIE, Journal of Electronic Imaging, vol. 19, No. 3, XP040541799, Aug. 11, 2010, 12 pages.
Fan, X., et al., "A Novel Coefficient Scanning Scheme for Directional Spatial Prediction-Based Image Compression," Proceedings of the 2003 International Conference on Multimedia and Expo, ICME, XP010650616, Jul. 6, 2003, pp. 557-560.
Ye, Y., et al., "Improved Intra Coding," ITU—Telecommunications Standardization Sector, Video Coding Experts Group (VCEG), VCEG-AG11, Study Group 16, Question 6, XP030003615, Oct. 20, 2007, 6 pages.
Sullivan, G., et al., "JVT 1st Meeting and VCEG 15th Meeting Draft Report," JVT-A005, Dec. 27, 2001, Draft 1, 18 pages.
Sullivan, G., "Summary Report of 1st JVT Meeting," Pattaya Meeting, JVT-A005Summary, Dec. 7, 2001, 7 pages.
Sullivan, G., et al., "Meeting Report of the 14th VCEG Meeting," ITU—Telecommunications Standardization Sector, Study Group 16, Question 6, Video Coding Experts Group (VCEG), VCEG-N-88, Draft 1, 14th Meeting: Santa Barbara, CA, Sep. 24-27, 2001, 53 pages.
Suhring, K., "AHG Report: Test Model and Software," ITU—Telecommunications Standardization Sector, Study Group 16, Question 6, Video Coding Experts Group (VCEG), VCEG-004, 15th Meeting Pattaya, Thailand, Dec. 4-6, 2001, 4 pages.
Sullivan, G., "Ad Hoc Group Report: H.26L Development," ITU—ITU—Telecommunications Standardization Sector, Study Group 16, Question 6, Video Coding Experts Group (VCEG), VCEG-O05, 15th Meeting: Pattaya, Thailand, Dec. 4-6, 2001, 1 page.
Horowitz, M., et al, "H.26L Complexity Ad-Hoc Group Report," ITU—Telecommunications Standardization Sector, Study Group 16, Question 6, Video Coding Experts Group (VCEG), VCEG-O06, 15th Meeting, Pattaya, Thailand, Dec. 3-7, 2001, 3 pages.
Lindberg, D., et al., "AdHoc Report: H.26L Profiles & Applications," ITU—Telecommunications Standardization Sector, Study Group 16, Question 6, Video Coding Experts Group (VCEG), VCEG-O07, 15th Meeting, Pattaya, Thailand, Dec. 3-7, 2001, 3 pages.
List, P., "Report of the Ad Hoc Committee on Loop Filter Improvement," ITU—Telecommunications Standardization Sector, Study Group 16, Question 6, Video Coding Experts Group (VCEG), VCEG-O08, 15th Meeting, Pattaya, Thailand, Dec. 2001, 1 page.
Kerofsky, L., "H.26L Transform/quantization Complexity Reduction Ad Hoc Report," ITU—Telecommunications Standardization Sector, Study Group 16, Question 6, Video Coding Experts Group (VCEG), VCEG-O09, 15th Meeting, Pattaya, Thailand, Dec. 4-6, 2001, 4 pages.
Wiegand, T., "Report of AHG on incorporation of Enhanced AnnexU/H.263," ITU—Telecommunications Standardization Sector, Study Group 16, Question 6, Video Coding Experts Group (VCEG), VCEG-O10, Jul. 29, 2014, 9 pages.
Wiegand, T., "Report of AHG on Incorporation of Enhanced AnnexU/H.263," ITU—Telecommunications Standardization Sec-

(56) References Cited

OTHER PUBLICATIONS tor, Study Group 16, Question 6, Video Coding Experts Group (VCEG), VCEG-O10, Dec. 6, 2001, 9 pages.
Wedi, T., et al., "H.26L Interpolation Filtering Ad Hoc Report," ITU—Telecommunications Standardization Sector, Study Group 16, Question 6, Video Coding Experts Group (VCEG), VCEG-AH11, 15th Meeting, Pattaya, Thailand, Dec. 4-6, 2001, 2 pages.
"Fast Motion E," ITU—Telecommunications Standardization Sector, Study Group 16, Question 6, Video Coding Experts Group (VCEG), 15th Meeting Pattaya, Thailand, VCEG-O12, Dec. 4-6, 2001, 1 page.
"Ad Hoc Committee Report: Interlaced Video Coding in H.26L," ITU—T Telecommunications Standardization Sector, Study Group 16, Question 6, VCEG-O13, 15th Meeting, Pattaya, Thailand, Dec. 4-6, 2001, Nov. 26, 2001, 1 page.
"Profile Framework for H.26L," ITU—Telecommunications Standarization Sector, Study Group 16, Video Coding Experts Group (Question 6), VCEG-O14, 15th Meeting, Pattaya, Thailand, Dec. 3-7, 2001, VCEG-014, 7 pages.
Lindberg, D., "Profile Framework for H.26L," ITU—Telecommunications Standardization Sector, Study Group 16, Video Coding Experts Group (Question 6), VCEG-O14, 15th Meeting Pattaya, Thailand, Dec. 3-7, 2001, 13 pages.
Polizotto, J., et al., "Liaison Letter (VCEG Document No. VCEG-O15)," International Multimedia Telecommunications Consortium, Oct. 6, 2001, 2 pages.
Wedi, T., "More Results on Adaptive Interpolation Filter for H.26L," ITU—Telecommunication Standardization Sector, Study Group 16, Question 6, Video Coding Experts Group (VCEG), VCEG-O28, 15th Meeting, Pattaya, Thailand Dec. 4-6, 2001, 10 pages.
Schwarz, H., "Tree-Structured Macroblock Partition," ITU—Telecommunications Standardization Sector, Study Group 16, Questions 6, Video Coding Experts Group (VCEG), VCEG-O17, 15th Meeting, Pattaya, Thailand, Dec. 4-6, 2001, 6 pages.
Schwarz, H., "Tree-Structured Macroblock Partition," ITU—Telecommunications Standardization Sector, Study Group 16, Questions 6, Video Coding Experts Group (VCEG), VCEG-O17r3, 15th Meeting, Pattaya, Thailand, Dec. 4-6, 2001, 9 pages.
"VCEG-017.xls," Spreadsheet, Retreived from http://wftp3.itu.int/av-arch/video-site/0112_Pat/, Nov. 29, 2001, 32 pages.
Marpe, D., et al., "Improved CABAC," ITU—Telecommunication Standardization Sector, Study Group 16, Question 6, Video Coding Experts Group (VCEG), VCEG-O18, 15th Meeting: Pattaya, Thailand, Dec. 4-6, 2001, 6 pages.
Marpe, D., et al., "Improved CABAC," ITU—Telecommunication Standardization Sector, Study Group 16, Question 6, Video Coding Experts Group (VCEG), VCEG-O18r1, 15th Meeting: Pattaya, Thailand, Dec. 4-6, 2001, 9 pages.
"VCEG-O18.xls," Spreadsheet, Retreived from http://wftp3.itu.int/av-arch/video-site/0112_Pat/, Nov. 28, 2001, 41 pages.
Hong, M., et al., "Further Experimental Results of VCEG-N30 (Loop Filter for Improving Visual Quality)," ITU—Telecommunication Standardization Sector, Study Group 16, Question 6, Video Coding Experts Group (VCEG), VCEG-O19, 15th Meeting: Pattaya, Thailand, Dec. 4-6, 2001, 6 pages.
"VCEG-019.xls," Spreadsheet, Retreived from http://wftp3.itu.int/av-arch/video-site/0112_Pat/, Nov. 28, 2001, 3 pages.
Sun, S., et al., "Global Motion Vector Coding (GMVC)," ITU—Telecommunication Standardization Sector, Study Group 16, Question 6, Video Coding Experts Group (VCEG), VCEG-O20, 15th Meeting: Pattaya, Thailand, Dec. 4-7, 2001, 6 pages.
Sun, S., et al., "Global Motion Vector Coding (GMVC)," ITU—Telecommunication Standardization Sector, Study Group 16, Question 6, Video Coding Experts Group (VCEG), VCEG-O20, 15th Meeting: Pattaya, Thailand, Dec. 4-7, 2001, 9 pages.
Sun, S., et al., "GMVC: Core Experiment Report," ITU—Telecommunication Standardization Sector, Study Group 16, Question 6, Video Coding Experts Group (VCEG), VCEG-O21, 15th Meeting: Pattaya, Thailand, Dec. 4-7, 2001, 17 pages.

"VCEG-O21.xls," Spreadsheet, Retreived from http://wftp3.itu.int/av-arch/video-site/0112_Pat/, Nov. 28, 2011, 18 pages.
Adachi, S., et al., "Refined Results on the Low-Overhead Prediction Modes," ITU—Telecommunication Standardization Sector, Study Group 16, Question 6, Video Coding Experts Group (VCEG), VCEG-Oxx, 15th Meeting: Pattaya, Thailand, Dec. 4-6, 2001, 12 pages.
"VCEG-O22r1.zip," Retreived From http://wftp3.itu.int/av-arch/video-site/0112_Pat/, Nov. 28, 2011, 5 pages.
Sekiguchi, S., et al., "Improvements of CABAC in Inter-frame Coding," ITU—Telecommunication Standardization Sector, Study Group 16, Question 6, Video Coding Experts Group (VCEG), VCEG-O23, 15th Meeting: Pattaya, Thailand, Dec. 4-6, 2001, 8 pages.
Kurceren, R., et al., "Improvements on CABAC," ITU—Telecommunication Standardization Sector, Study Group 16, Question 6, Video Coding Experts Group (VCEG), VCEG-O24, 15th Meeting: Pattaya, Thailand, Dec. 4-6, 2001, 4 pages.
Kurceren, R., et al., "Improvements on CABAC," ITU—Telecommunication Standardization Sector, Study Group 16, Question 6, Video Coding Experts Group (VCEG), VCEG-O24r1, 15th Meeting: Pattaya, Thailand, Dec. 4-6, 2001, 6 pages.
Hallapuro, A., et al., "Low Complexity (I)DCT," ITU—Telecommunication Standardization Sector, Study Group 16, Question 6, Video Coding Experts Group (VCEG), VCEG-O25, 15th Meeting: Pattaya, Thailand, Dec. 4-6, 2001, 11 pages.
"VCEG-O25," Spreadsheet, Retreived from http://wftp3.itu.int/av-arch/video-site/0112_Pat/, Nov. 28, 2001, 5 pages.
Joch, A., et al., "Performance analysis of H.26L coding features," ITU—Telecommunications Standardization Sector, Study Group 16, Question 6, Video Coding Experts Group (VCEG), 15th Meeting: Pattaya, Thailand, VCEG-O42, Dec. 4-6, 2001, 9 pages.
"VCEG-O42.xls," Spreadsheet, Retreived From http://wftp3.itu.int/av-arch/video-site/0112_Pat/, Nov. 28, 2001, 32 pages.
Kim, C., et al., "High Complexity Mode Decision for Error Prone Environment," ITU—Telecommunications Standardization Sector, Study Group 16, Question 6, Video Coding Experts Group (VCEG), 15th Meeting: Pattaya, Thailand, VCEG-O43, Dec. 4-6, 2001, 3 pages.
"VCEG-O43.xls," Spreadsheet, Retreived From http://wftp3.itu.int/av-arch/video-site/0112_Pat/, Nov. 28, 2001, 85 pages.
Kim, C., et al., "High Complexity Mode Decision for Error Prone Environment," ITU—Telecommunications Standardization Sector, Study Group 16, Question 6, Video Coding Experts Group (VCEG), 15th Meeting: Pattaya, Thailand, VCEG-O43, Dec. 4-6, 2001, 6 pages.
Hannuksela, M., "H.26L File Format," ITU—Telecommunications Standardization Sector, Study Group 16, Question 6, Video Coding Experts Group (VCEG), 15th Meeting: Pattaya, Thailand, VCEG-O44, Dec. 3-7, 2001, 20 pages.
Hannuksela, M., "H.26L File Format," ITU—Telecommunications Standardization Sector, Study Group 16, Question 6, Video Coding Experts Group (VCEG), 15th Meeting: Pattaya, Thailand, VCEG-O44r1, Dec. 3-7, 2001, 21 pages.
Hannuksela, M., "Slice-Oriented Hypothetical Reference Decoder," ITU—Telecommunications Standardization Sector, Study Group 16, Question 6, Video Coding Experts Group (VCEG), 15th Meeting: Pattaya, Thailand, VCEG-O45, Dec. 3-7, 2001, 10 pages.
Hannuksela, M., "Slice-Oriented Hypothetical Reference Decoder," ITU—Telecommunications Standardization Sector, Study Group 16, Question 6, Video Coding Experts Group (VCEG), 15th Meeting: Pattaya, Thailand, VCEG-O45r1, Dec. 3-7, 2001, 11 pages.
Hannuksela, M., "New Image Segmentation Method," ITU—Telecommunications Standardization Sector, Study Group 16, Question 6, Video Coding Experts Group (VCEG), 15th Meeting: Pattaya, Thailand, VCEG-O46, Dec. 3-7, 2001, 16 pages.
Hannuksela, M., "New Image Segmentation Method," ITU—Telecommunications Standardization Sector, Study Group 16, Question 6, Video Coding Experts Group (VCEG), 15th Meeting: Pattaya, Thailand, VCEG-O46r1, Dec. 3-7, 2001, 17 pages.
Kurceren, R., et al., "New Macroblock Modes for SP-frames," ITU—Telecommunications Standardization Sector, Study Group 16, Ques-

(56) References Cited

OTHER PUBLICATIONS tion 6, Video Coding Experts Group (VCEG), 15th Meeting: Pattaya, Thailand, VCEG-O47, Dec. 4-6, 2001, 6 pages.
Xue, Z., et al., "An Automatic Mode Decision Method for Intra Frame Coding and Decoding," ITU—Telecommunications Standardization Sector, Study Group 16, Question 6, Video Coding Experts Group (VCEG), 15th Meeting: Pattaya, Thailand, VCEG-O48, Dec. 3-7, 2001, 9 pages.
Xue, Z., et al., "An Automat ic Mode Dec i s ion Method for Int r a Frame Coding and," ITU—Telecommunications Standardization Sector, Study Group 16, Question 6, Video Coding Experts Group (VCEG), 15th Meeting: Pattaya, Thailand, VCEG-O48, Dec. 3-7, 2001, 12 pages.
Shen, SM., et al., "Restricted Multiple Reference Frames with Long Term Frame Buffer," ITU—Telecommunications Standardization Sector, Study Group 16, Question 6, Video Coding Experts Group (VCEG), 15th Meeting: Pattaya, Thailand, VCEG-O49, Dec. 3-7, 2001, 7 pages.
Shen, SM. et al., "Restricted Multiple Reference Frames with Long Term Frame Buffer," ITU—Telecommunications Standardization Sector, Study Group 16, Question 6, Video Coding Experts Group (VCEG), 15th Meeting: Pattaya, Thailand, VCEG-O49, Dec. 3-7, 2001, 10 pages.
Teck-Wee, F., et al., "Medium Complexity Loop-Filter," ITU—Telecommunications Standardization Sector, Study Group 16, Question 6, Video Coding Experts Group (VCEG), 15th Meeting: Pattaya, Thailand, VCEG-O50, Dec. 3-7, 2001, 14 pages.
"VCEG-O50.xls," Spreadsheet, Retrieved From http://wftp3.itu.int/av-arch/video-site/0112_Pat/, Nov. 28, 2001, 12 pages.
Teck-Wee, F., et al., "Medium Complexity Loop-Filter," ITU—Telecommunications Standardization Sector, Study Group 16, Question 6, Video Coding Experts Group (VCEG), 15th Meeting: Pattaya, Thailand, VCEG-O50, Dec. 3-7, 2001, 17 pages.
"VCEG-O50r1.xls," Spreadsheet, Retrieved From http://wftp3.itu.int/av-arch/video-site/0112_Pat/, Dec. 31, 2001, 12 pages.
Wiegand, T., et al., "H.26L TML 8 for Digital Cinema Applications," ITU—Telecommunications Standardization Sector, Study Group 16, Question 6, Video Coding Experts Group (VCEG), 15th Meeting: Pattaya, Thailand, VCEG-O51, Dec. 4-6, 2001, 8 pages.
Suzuki, T., et al., "New Quantization Tools," ITU—Telecommunications Standardization Sector, Study Group 16, Question 6, Video Coding Experts Group (VCEG), 15th Meeting: Pattaya, Thailand, VCEG-O52, Dec. 4-6, 2001, 13 pages.
Suzuki, T., et al., "Tool to support random access," ITU—Telecommunications Standardization Sector, Study Group 16, Question 6, Video Coding Experts Group (VCEG), 15th Meeting: Pattaya, Thailand, VCEG-O53, Dec. 4-6, 2001, 6 pages.
Sullivan, G., "Terms of Reference for Joint Video Team Work," ITU—Telecommunications Standardization Sector, Study Group 16, Question 6, Video Coding Experts Group (VCEG), 15th Meeting: Pattaya, Thailand, VCEG-O54, Dec. 4-6, 2001, 14 pages.
Sullivan, G., "Report of Question 6 activities at ITU-T SG16 WP3 Meeting Oct. 2001," ITU—Telecommunications Standardization Sector, Study Group 16, Question 6, Video Coding Experts Group (VCEG), 15th Meeting: Pattaya, Thailand, VCEG-O55, Dec. 4-6, 2001, 1 page.
Lindbergh, D., "VCEG Requirements for Proposed JVT Codec Output from Dec. 4, 2001 VCEG Ad-Hoc," VCEG-O56, Dec. 5, 2001, 3 pages.
Wang, Y., et al., "Core Experiment Description of Sub-Picture Coding," ITU—Telecommunications Standardization Sector, Study Group 16, Question 6, Video Coding Experts Group (VCEG), 15th Meeting: Pattaya, Thailand, VCEG-O57, Dec. 3-7, 2001, 10 pages.
Frojdh, P., et al., "Interim JVT File Format," ITU—Telecommunications Standardization Sector, Study Group 16, Question 6, Video Coding Experts Group (VCEG), 15th Meeting: Pattaya, Thailand, VCEG-O58, Dec. 4-6, 2001, 2 pages.
Hannuksela, M., "Interim JVT File Format," ITU—Telecommunications Standardization Sector, Study Group 16, Question 6, Video Coding Experts Group (VCEG), 15th Meeting: Pattaya, Thailand, VCEG-O58, Dec. 3-7, 2001, 23 pages.
Borgwardt, P., "Core Experiment on Interlaced Video Coding," ITU—Telecommunications Standardization Sector, Study Group 16, Question 6, Video Coding Experts Group (VCEG), 15th Meeting: Pattaya, Thailand, VCEG-O59, Dec. 4-6, 2001, 10 pages.
He, Y., et al., "H.26L-based fine granularity scalable video coding," ITU—Telecommunications Standardization Sector, Study Group 16, Question 6, Video Coding Experts Group (VCEG), 15th Meeting: Pattaya, Thailand, VCEG-O60, Dec. 4-6, 2001, 7 pages.
He, Y., et al., "H.26L-based fine granularity scalable video coding," ITU—Telecommunications Standardization Sector, Study Group 16, Question 6, Video Coding Experts Group (VCEG), 15th Meeting: Pattaya, Thailand, VCEG-O60, Dec. 4-6, 2001, 10 pages.
Adachi, S., et al., "Core Experiments Description on Improved Macroblock Prediction Modes," ITU—Telecommunications Standardization Sector, Study Group 16, Question 6, Video Coding Experts Group (VCEG), 15th Meeting: Pattaya, Thailand, VCEG-O61, Dec. 4-6, 2001, 9 pages.
Foreign Communication From a Counterpart Application, Korean Application No. 10-2013-7007157, Korean Notice of Allowance dated Aug. 26, 2014, 3 pages.
Kondo, S., et al., "New Prediction Method to Improve B-Picture Coding Efficiency," ITU—Telecommunication Standardization Sector, Study Group 16, Question 6, Video Coding Experts Group (VCEG), VCEG-O26, 15th Meeting: Pattaya, Thailand, Dec. 4-6, 2001, 9 pages.
Kondo, S., et al., "New Prediction Method to Improve B-Picture Coding Efficiency," ITU—Telecommunication Standardization Sector, Study Group 16, Question 6, Video Coding Experts Group (VCEG), VCEG-O26, 15th Meeting: Pattaya, Thailand, Dec. 4-6, 2001, 11 pages.
Kadono, S., et al., "Improved 2D-VLC coding for High-Bitrate," ITU—Telecommunications Standardization Sector, Study Group 16, Question 6, Video Coding Experts Group (VCEG), 15th Meeting: Pattaya, Thailand, VCEG-O27, Dec. 4-6, 2001, 12 pages.
Kadono, S., et al., "Improved 2D-VLC Coding for High-Bitrate," ITU—Telecommunication Standardization Sector, Study Group 16, Question 6, Video Coding Experts Group (VCEG), VCEG-O27, 15th Meeting: Pattaya, Thailand, Dec. 4-6, 2001, 12 pages.
Kimata, H. "Proposal of GMVC syntax," ITU—Telecommunications Standardization Sector, Study Group 16, Question 6, Video Coding Experts Group (VCEG), 15th Meeting: Pattaya, Thailand, VCEG-O28, Dec. 3-7, 2001, 9 pages.
"VCEG-O28.xls," Spreadsheet, Retrieved From http://wftp3.itu.int/av-arch/video-site/0112_Pat/, Nov. 27, 2001, 1 page.
Kimata, H. "Proposal of GMVC syntax," ITU—Telecommunications Standardization Sector, Study Group 16, Question 6, Video Coding Experts Group (VCEG), 15th Meeting: Pattaya, Thailand, VCEG-O28, Dec. 3-7, 2001, 12 pages.
Kimata, H., "Proposal of Global Motion Compensation enhancing Global Motion Vector Coding scheme," ITU—Telecommunications Standardization Sector, Study Group 16, Question 6, Video Coding Experts Group (VCEG), 15th Meeting: Pattaya, Thailand, VCEG-O29, Dec. 3-7, 2001, 10 pages.
"VCEG-O29.xls," Spreadsheet, Retrieved From http://wftp3.itu.int/av-arch/video-site/0112_Pat/, Nov. 27, 2001, 1 page.
Kimata, H., "Proposal of Global Motion Compensation enhancing Global Motion Vector Coding scheme," ITU—Telecommunications Standardization Sector, Study Group 16, Question 6, Video Coding Experts Group (VCEG), 15th Meeting: Pattaya, Thailand, VCEG-O29r1, Dec. 3-7, 2001, 10 pages.
Kimata, H., "Proposal of Global Motion Compensation enhancing Global Motion Vector Coding scheme," ITU—Telecommunications Standardization Sector, Study Group 16, Question 6, Video Coding Experts Group (VCEG), 15th Meeting: Pattaya, Thailand, VCEG-O29r1, Dec. 3-7, 2001, 13 pages.
Wien, M., et al., "Simplified Adaptive Block Transforms," ITU—Telecommunications Standardization Sector, Study Group 16, Question 6, Video Coding Experts Group (VCEG), 15th Meeting: Pattaya, Thailand, VCEG-O30, Dec. 4-6, 2001, 12 pages.
Wien, M., et al., "Simplified Adaptive Block Transforms," ITU—Telecommunications Standardization Sector, Study Group 16, Ques-

(56) References Cited

OTHER PUBLICATIONS tion 6, Video Coding Experts Group (VCEG), 15th Meeting: Pattaya, Thailand, VCEG-O30, Dec. 4-6, 2001, 15 pages.
Wien, M. et al., "Intra Coding using Variable Block Sizes," ITU—Telecommunications Standardization Sector, Study Group 16, Question 6, Video Coding Experts Group (VCEG), 15th Meeting: Pattaya, Thailand, VCEG-O31, Dec. 4-6, 2001, 12 pages.
Wien, M., et al., "Intra Coding using Variable Block Sizes," ITU—Telecommunications Standardization Sector, Study Group 16, Question 6, Video Coding Experts Group (VCEG), 15th Meeting: Pattaya, Thailand, VCEG-O31, Dec. 4-6, 2001, 15 pages.
Wien, M., "Interlaced Coding with Frame Motion Compensation and Field Update Coding," ITU—Telecommunications Standardization Sector, Study Group 16, Question 6, Video Coding Experts Group (VCEG), 15th Meeting: Pattaya, Thailand, VCEG-O32, Dec. 4-6, 2001, 9 pages.
Wien, M., "Interlaced Coding with Frame Motion Compensation and Field Update Coding," ITU—Telecommunications Standardization Sector, Study Group 16, Question 6, Video Coding Experts Group (VCEG), 15th Meeting: Pattaya, Thailand, VCEG-O32, Dec. 4-6, 2001, 12 pages.
Wien, M., "Core Experiment Report on Global Motion Vector Coding," ITU—Telecommunications Standardization Sector, Study Group 16, Question 6, Video Coding Experts Group (VCEG), 15th Meeting: Pattaya, Thailand, VCEG-O33, Dec. 4-6, 2001, 29 pages.
Wien, M., "Core Experiment Report on Global Motion Vector Coding," ITU—Telecommunications Standardization Sector, Study Group 16, Question 6, Video Coding Experts Group (VCEG), 15th Meeting: Pattaya, Thailand, VCEG-O33, Dec. 4-6, 2001, 32 pages.
Base, G., et al., "Enhanced coding of coefficients," ITU—Telecommunications Standardization Sector, Study Group 16, Question 6, Video Coding Experts Group (VCEG), 15th Meeting: Pattaya, Thailand, VCEG-O34, Dec. 4-6, 2001, 3 pages.
"VCEG-O34," Spreadsheet, Retrieved From http://wftp3.itu.int/av-arch/video-site/0112_Pat/, Nov. 29, 2001, 2 pages.
Base, G., et al., "Enhanced coding of coefficients," ITU—Telecommunications Standardization Sector, Study Group 16, Question 6, Video Coding Experts Group (VCEG), 15th Meeting: Pattaya, Thailand, VCEG-O34, Dec. 4-6, 2001, 5 pages.
Base, G., et al., "Enhanced coding of coefficients," ITU—Telecommunications Standardization Sector, Study Group 16, Question 6, Video Coding Experts Group (VCEG), 15th Meeting: Pattaya, Thailand, VCEG-O34r2, Dec. 4-6, 2001, 5 pages.
Base, G., et al., "Improved quantizer selection for bitrate adjustment," ITU—Telecommunications Standardization Sector, Study Group 16, Question 6, Video Coding Experts Group (VCEG), 15th Meeting: Pattaya, Thailand, VCEG-O35, Dec. 4-6, 2001, 2 pages.
Base, G., et al., "Improved quantizer selection for bitrate adjustment," ITU—Telecommunications Standardization Sector, Study Group 16, Question 6, Video Coding Experts Group (VCEG), 15th Meeting: Pattaya, Thailand, VCEG-O35, Dec. 4-6, 2001, 5 pages.
Base, G., et al., "Improved quantizer selection for bitrate adjustment," ITU—Telecommunications Standardization Sector, Study Group 16, Question 6, Video Coding Experts Group (VCEG), 15th Meeting: Pattaya, Thailand, VCEG-O35r2, Dec. 4-6, 2001, 5 pages.
Kim, C., et al., "Verification of Adaptive Double Scan on Common Conditions," ITU—Telecommunications Standardization Sector, Study Group 16, Question 6, Video Coding Experts Group (VCEG), 15th Meeting: Pattaya, Thailand, VCEG-O36, Dec. 4-6, 2001, 3 pages.
"VCEG-O36," Spreadsheet, Retrieved From http://wftp3.itu.int/av-arch/video-site/0112_Pat/, Nov. 27, 2001, 1 page.
Kim, C., et al., "Verification of Adaptive Double Scan on Common Conditions," ITU—Telecommunications Standardization Sector, Study Group 16, Question 6, Video Coding Experts Group (VCEG), 15th Meeting: Pattaya, Thailand, VCEG-O36, Dec. 4-6, 2001, 6 pages.
Wang, L., et al., "Interlace Coding Tools for H.26L Video Coding," ITU—Telecommunications Standardization Sector, Study Group 16, Question 6, Video Coding Experts Group (VCEG), 15th Meeting: Pattaya, Thailand, VCEG-O37, Dec. 4-6, 2001, 20 pages.
Wang, L., et al., "Interlace Coding Tools for H.26L Video Coding," ITU—Telecommunications Standardization Sector, Study Group 16, Question 6, Video Coding Experts Group (VCEG), 15th Meeting: Pattaya, Thailand, VCEG-O37, Dec. 4-6, 2001, 26 pages.
Joch, A., et al., "Initial Results From a Near-Real-Time H.26L Encoder," ITU—Telecommunications Standardization Sector, Study Group 16, Question 6, Video Coding Experts Group (VCEG), 15th meeting, Pattaya, Thailand, VCEG-O38, Dec. 4-6, 2001, 5 pages.
Joch, A., et al., "Initial results from a near-real-time H.26L encoder," ITU—Telecommunications Standardization Sector, Study Group 16, Question 6, Video Coding Experts Group (VCEG), 15th Meeting: Pattaya, Thailand, VCEG-O38, Dec. 4-6, 2001, 6 pages.
Cote, G., et al., "Lower complexity deblocking filter with in-place filtering," ITU—Telecommunications Standardization Sector, Study Group 16, Question 6, Video Coding Experts Group (VCEG), 15th Meeting: Pattaya, Thailand, VCEG-O39, Dec. 4-6, 2001, 6 pages.
Cote, G., et al., "Lower complexity deblocking filter with in-place filtering," ITU—Telecommunications Standardization Sector, Study Group 16, Question 6, Video Coding Experts Group (VCEG), 15th Meeting: Pattaya, Thailand, VCEG-O39, Dec. 4-6, 2001, 9 pages.
Gallant, M., et al., "Interlaced Field Coding Core Experiment," ITU—Telecommunications Standardization Sector, Study Group 16, Question 6, Video Coding Experts Group (VCEG), 15th Meeting: Pattaya, Thailand, VCEG-O40, Dec. 4-6, 2001, 2 pages.
"VCEG-O40.xls," Spreadsheet, Retrieved From http://wftp3.itu.int/av-arch/video-site/0112_Pat/, Dec. 13, 2001, 1 page.
Gallant, M., et al., "Interlaced Field Coding Core Experiment," ITU—Telecommunications Standardization Sector, Study Group 16, Question 6, Video Coding Experts Group (VCEG), 15th Meeting: Pattaya, Thailand, VCEG-O40, Dec. 4-6, 2001, 3 pages.
Winger, L., et al., "16×16 Planar Intra Prediction Mode (imode 3) Improvement," ITU—Telecommunications Standardization Sector, Study Group 16, Question 6, Video Coding Experts Group (VCEG), 15th Meeting: Pattaya, Thailand, VCEG-Oxx, Dec. 4-6, 2001, 1 page.
Winger, L., et al., "16×16 planar intra prediction mode (imode 3) improvement," ITU—Telecommunications Standardization Sector, Study Group 16, Question 6, Video Coding Experts Group (VCEG), 15th Meeting: Pattaya, Thailand, VCEG-O41, Dec. 4-6, 2001, 4 pages.
Foreign Communication From a Counterpart Application, Japanese Application No. 2013530537, Japanese Notice of Allowance dated Jun. 10, 2014, 4 pages.
Partial English Translation and Abstract of Japanese Patent Application No. JP2003250157A, Jun. 27, 2014, 12 pages.
34th VCEG Meeting Report, Telecommunication Standardization Sector, Study Period 2005-2008, Antalya, Turkey, Study Group 16, Question 6, VCEG-AH01, Jan. 12-13, 2008, 25 pages.
Bjontegaard, G., "AHG Computational Efficiency," ITU—Telecommunications Standardization Sector, Study Group 16, Question 6, Video Coding Experts Group (VCEG), VCEG-AH02, Jan. 12-13, 2008, 1 page.
Wedi, T., et al., "AHG Report—Coding Efficiency," ITU—Telecommunications Standardization Sector, Study Group 16, Question 6, Video Coding Experts Group (VCEG), VCEG-AH03, 34th Meeting: Antalya, Turkey, Jan. 12-13, 2008, 2 pages.
Wedi, T., et al., "AHG Report—Coding Efficiency," ITU—Telecommunications Standardization Sector, Study Group 16, Question 6, Video Coding Experts Group (VCEG), VCEG-AH03, 34th Meeting: Antalya, Turkey, Jan. 12-14, 2008, 3 pages.
LS on Scalable Video Coding, Telecommunication Standardization Sector, Study Period 2005-2008, Study Group 16, TD 446 (GEN/16), VCEG-AH04, Geneva, Apr. 22-May 2, 2008, 1 page.
LS on Possibilities to Augment Video by Metadata, Telecommunication Standardization Sector, Study Period 2005-2008, Study Group 16, TD 447 (GEN/16), VCEG-AH05, Geneva, Apr. 22-May 2, 2008, 2 pages.
LS on Codecs and Common IMS, Telecommunication Standardization Sector, Study Period 2005-2008, Study Group 16, TD 450 (GEN/16), VCEG-AH06, Geneva, Apr. 22-May 2, 2008, 2 pages.

(56) References Cited

OTHER PUBLICATIONS

Reply LS on J.161 Revision 1 Video Codecs and Free-Viewpoint Television Requirements (COM 16-LS 235), Telecommunication Standardization Sector, Study Period 2005-2008, Study Group 16, TD 451 (GEN/16), VCEG-AH07, Geneva, Apr. 22-May 2, 2008, 1 page.
Lee, D., et al., "LS on New Project ISO/IEC 29199 JPEG Digital Imaging Systems Integration," Telecommunication Standardization Sector, Study Period 2005-2008, Study Group 16, TD 461 (GEN/16), VCEG-AH08, Geneva, Apr. 22-May 2, 2008, 3 pages.
Miyaji, S., et al., "LS on Compressed Bitstream Splicing Requirements for Digital Program Insertion," Telecommunication Standardization Sector, Study Period 2005-2008, Study Group 16, TD 466 (GEN/16), VCEG-AH09, Geneva, Apr. 22-May 2, 2008, 2 pages.
Proposed draft new Recommendation J.h-dpi, Seamless Splicing for Heterogeneous MPEG-2/H.264 Bitstreams, KDDI Corporation, Question 7/9, Telecommunication Standardization Sector, Study Period 2005-2008, VCEG-AH09 Attachment, COM 9-C104-E, Oct. 2007, 10 pages.
Tan, TK., et al., "Recommended Simulation Common Conditions for Coding Efficiency Experiments Revision 2," ITU—Telecommunications Standardization Sector, Study Group 16, Question 6, Video Coding Experts Group (VCEG), 34th Meeting: Antalya, Turkey, Jan. 2008, VCEG-AH10, 6 pages.
Tan, TK., et al., "Recommended Simulation Common Conditions for Coding Efficiency Experiments Revisions 2," ITU—Telecommunications Standardization Sector, Study Group 16, Questions 6, Video Coding Experts Group (VCEG), 34th Meeting: Antalya, Turkey, Jan. 12-13, 2008, VCEG-AH10r2, 6 pages.
Tan, TK., et al., "Recommended Simulation Common Conditions for Coding Efficiency Experiments Revision 2," ITU—Telecommunications Standardization Sector, Study Group 16, Question 6, Video Coding Experts Group (VCEG), 34th Meeting: Antalya, Turkey, VCEG-AH10r3, Jan. 12-13, 2008, 6 pages.
Kim, D., et al., "Enhanced Intra Coding," ITU—Telecommunications Standardization Sector, Study Group 16, Question 6, Video Coding Experts Group (VCEG), 34th Meeting: Antalya, Turkey, VCEG-AH11, Jan. 12-13, 2008, 6 pages.
Liu, Y., et al., "Improving Intra DC Prediction," ITU—Telecommunications Standardization Sector Study Group 16, Question 6, Video Coding Experts Group (VCEG), 34th Meeting: Antalya, Turkey, VCEG-AH12, Jan. 12, 2008, 5 pages.
Chujoh, T., et al., "3D-DCT Video Coding for Prediction Error," ITU—Telecommunications Standardization Sector, Study Group 16, Question 6, Video Coding Experts Group (VCEG), 34th Meeting: Antalya, Turkey, VCEG-AH13, Jan. 12-13, 2008, 5 pages.
Shim, S., et al., "Adaptive Scanning Patterns for Intra Prediction," ITU—Telecommunications Standardization Sector, Study Group 16, Question 6, Video Coding Experts Group (VCEG), 34th Meeting: Antalya, Turkey, VCEG-AH14, Jan. 12-13, 2008, 8 pages.
Kamp, S., et al., "Decoder Side Motion Vector Derivation with Multiple Reference Pictures," ITU—Telecommunications Standardization Sector, Study Group 16, Question 6, Video Coding Experts Group (VCEG), 34th Meeting: Antalya, Turkey, VCEG-AH15, Jan. 12-13, 2008, 13 pages.
Kamp, S., et al., "Decoder Side Motion Vector Derivation with Multiple References Pictures," ITU—Telecommunications Standardization Sector, Study Group 16, Question 6, Video Coding Experts Group (VCEG), 34th Meeting: Antalya, Turkey, VCEG-AH15r1, Jan. 12-13, 2008, 14 pages.
Divorra, Q., et al., "Hierarchical B-Frame Results on Geometry-adaptive Block Partitioning," ITU—Telecommunications Standardization Sector, Study Group 16, Question 6, Video Coding Experts Group (VCEG), 34th Meeting: Antalya, Turkey, VCEG-AH16, Jan. 12, 2008, 6 pages.
Rusanovskyy, D., et al., "Simulation Results with Directional Interpolation Filter (DIF)," ITU—Telecommunications Standardization Sector, Study Group 16, Question 6, Video Coding Experts Group (VCEG), 34th Meeting: Antalya, Turkey, VCEG-AH17, Jan. 12-13, 2008, 3 pages.
Rusanovskyy, D., et al., "Implementation of Directional Interpolation Filter with 16-bit Interger Arithmetic," ITU—Telecommunications Standardization Sector, Study Group 16, Question 6, Video Coding Experts Group (VCEG), 34th Meeting: Antalya, Turkey, VCEG-AH18, Jan. 12-13, 2008, 4 pages.
Yamamoto, T., et al., "Weighted Prediction using Neighboring Pixels," ITU—Telecommunications Standardization Sector, Study Group 16, Question 6, Video Coding Experts Group (VCEG), 34th Meeting: Antalya, Turkey, VCEG-AH19, Jan. 12-13, 2008, 4 pages.
Ye, Y., et al., "Complexity Analysis of Improved Intra Coding," ITU—Telecommunications Standardization Sector, Study Group 16, Question 6, Video Coding Experts Group (VCEG), 34th Meeting: Antalya, Turkey, VCEG-AH20, Jan. 12-13, 2008, 6 pages.
Karczewicz, M., et al., "Rate Distortion Optimized Quantization," ITU—Telecommunications Standardization Sector, Study Group 16, Question 6, Video Coding Experts Group (VCEG), 34th Meeting: Antalya, Turkey, VCEG-AH21, Jan. 12-13, 2008, 3 pages.
Sim, D., et al., "New Intra MB Mode for Bandlimited Signals," ITU—Telecommunications Standardization Sector, Study Group 16, Question 6, Video Coding Experts Group (VCEG), 34th Meeting: Antalya, Turkey, VCEG-AH22, Jan. 12-13, 2008, 13 pages.
Yoshino, T., et al., "An Extended Intra Prediction Scheme Based on Frequency Component Representation," ITU—Telecommunications Standardization Sector, Study Group 16, Question 6, Video Coding Experts Group (VCEG), 34th Meeting: Antalya, Turkey, VCEG-AH23, Jan. 12, 2008, 4 pages.
Zhu, H., et al., "More Results on the Simplified Quarter-pel Pixel Interpolation," ITU—Telecommunications Standardization Sector, Study Group 16, Question 6, Video Coding Experts Group (VCEG), 34th Meeting: Antalya, Turkey, VCEG-AH24, Jan. 12-13, 4 pages.
Vermeirsch, K., et al., "New Macroblock Bipartitioning Modes for Inter Coding," ITU—Telecommunications Standardization Sector, Study Group 16, Question 6, Video Coding Experts Group (VCEG), 34th Meeting: Antalya, Turkey, VCEG-AH25, Jan. 12-13, 2008, 8 pages.
Karczewicz, M., et al., "Post-Filter Applicability to Intra Coding," ITU—Telecommunications Standardization Sector, Study Group 16, Question 6, Video Coding Experts Group (VCEG), 34th Meeting: Antalya, Turkey, VCEG-AH26, Jan. 12, 2008, 2 pages.
Andersson, K., et al., "Complexity Reduced Separable Adaptive Interpolation Filter," ITU—Telecommunications Standardization Sector, Study Group 16, Question 6, Video Coding Experts Group (VCEG), 34th Meeting: Antalya, Turkey, VCEG-AH27, Jan. 12-13, 2008, 5 pages.
Sullivan, G., et al., "Letter to IMTC re VCEG & MPEG Video Coding Cooperation," Joint Video Team (JVT) of ITU-T SG16 VCEG and ISO/IEC MPEG, JVT-A-001, Dec. 6, 2001, 1 page.
Sullivan, G., et al., "Letter to IETF AVT Regarding JVT Video Packetization," Joint Video Team (JVT) of ISO/IEC MPEG and ITU-T VCEG, JVT-A-002, Pattaya, Thiland, Dec. 5-6, 2001, 1 page.
Wiegand, T., "Joint Model No. 1 (JM-1)," Joint Video Team (JVT) of ISO/IEC MPEG and ITU-T VCEG, JVT-A003, Pattaya, Thailand, Dec. 3-7, 2001, 78 pages.
Wiegand, T., "Joint Model No. 1, Revision 1 (JM-1r1)," Joint Video Team (JVT) of ISO/IEC MPEG and ITU-T VCEG, Joint Model No. 1, Revision 1 (JM-1r1), JVT-A003r1, Pattaya, Thailand, Dec. 3-7, 2001, 79 pages.
"Requirements for JVT Codec," Joint Video Team (JVT) of ISO/IEC MPEG and ITU-T VCEG, JVT-004, Pattaya, Thailand, Dec. 3-7, 2001, 5 pages.
Sullivan, G., "JVT and VCEG Pattaya 1st Meeting Draft Report," JVT-004, Dec. 23, 2001, Draft 0, 15 pages.
Foreign Communication From a Counterpart Application, Russian Application No. 2013120076, Russian Notice of Allowance dated May 24, 2011, 9 pages.
Foreign Communication From a Counterpart Application, Russian Application No. 2013120076, English Translation of Russian Notice of Allowance dated May 24, 2011, 6 pages.

\* cited by examiner

SCANNING METHOD AND DEVICE, AND REVERSE SCANNING METHOD AND DEVICE

CROSS-REFERENCE TO RELATED APPLICATIONS

This application is a continuation of International Application No. PCT/CN2011/074558, filed on May 24, 2011, which claims priority to Chinese Patent Application No. 201010505932.3, filed on Sep. 30, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a scanning method and device, and a reverse scanning method and device in coding and decoding technologies.

BACKGROUND

When intra-predictive coding is performed on a video or an image, predictive coding is performed on blocks, which are divided from a current coded image, according to different prediction directions (prediction modes) so as to eliminate spatial redundancy of a video signal to obtain a prediction residual signal. Then the prediction residual signal is transformed so as to further centralize signal energy. Quantized transformed coefficients need to be scanned before entropy coding, so that a two-dimensional image signal or video signal is converted into a one-dimensional signal to facilitate processing of an entropy coding device. With the scanning, after a two-dimensional signal is converted into the one-dimensional signal, a signal amplitude is enabled to present a descending regular change, so as to adapt to the processing of the entropy coding device.

An existing video or image coding method adopts the coding technology based on a prediction direction. The coding technology uses the prediction direction as a guide signal, when a different prediction direction is selected, transform base and scanning order should be changed accordingly. In other words, the number of the scanning orders is the same as that of the prediction directions.

Although the method is capable of coding and decoding the video or image, a scanning order needs to be designed for each prediction direction, thereby increasing system complexity of a coder-decoder (codec) system. Especially, when an adaptive update scanning technology is adopted, each scanning order needs to be updated in real time, further increasing the system complexity of the codec system.

SUMMARY

Embodiments of the present invention provide a scanning method and device, and a reverse scanning method and device, so as to decrease the number of the scanning orders used in coding and decoding, and reduce system complexity of a codec system.

An embodiment of the present invention provides a scanning method, which includes: receiving quantized transformed coefficients of a current block; obtaining a prediction direction of the current block; finding, according to the prediction direction, a scanning order corresponding to the prediction direction of the current block, from a mapping relationship table of the prediction direction and the scanning order, where at least one scanning order in the mapping relationship table of the prediction direction and the scanning order corresponds to at least two prediction directions; and performing scanning processing on the coefficients by using the scanning order corresponding to the prediction direction of the current block.

Another embodiment of the present invention provides a reverse scanning method, which includes: obtaining a one-dimensional signal and prediction direction of a current block, where the one-dimensional signal and prediction direction of the current block are obtained through entropy decoding; finding, according to the prediction direction, a scanning order corresponding to the prediction direction of the current block, from a mapping relationship table of the prediction direction and the scanning order, where at least one scanning order in the mapping relationship table of the prediction direction and the scanning order corresponds to at least two prediction directions; and performing reverse scanning processing on the one-dimensional signal by using the scanning order corresponding to the prediction direction of the current block.

Another embodiment of the present invention provides a scanning device, which includes: a receiving unit configured to receive quantized transformed coefficients of a current block; an obtaining unit configured to obtain a prediction direction of the current block; a finding unit configured to find, according to the prediction direction obtained by the obtaining unit, a scanning order corresponding to the prediction direction of the current block, from a mapping relationship table of the prediction direction and the scanning order, where at least one scanning order in the mapping relationship table of the prediction direction and the scanning order corresponds to at least two prediction directions; and a scanning unit configured to perform scanning processing on the coefficients, which are received by the receiving unit, by using the scanning order corresponding to the prediction direction of the current block, where the scanning order is found by the finding unit.

Another embodiment of the present invention provides a reverse scanning device, which includes: an obtaining unit configured to obtain a one-dimensional signal and prediction direction of a current block, where the one-dimensional signal and prediction direction of the current block are obtained through entropy decoding; a finding unit configured to find, according to the prediction direction obtained by the obtaining unit, a scanning order corresponding to the prediction direction of the current block, from a mapping relationship table of the prediction direction and the scanning order, where at least one scanning order in the mapping relationship table of the prediction direction and the scanning order corresponds to at least two prediction directions; and a reverse scanning unit configured to perform reverse scanning processing on the one-dimensional signal, which is obtained by the obtaining unit, by using the scanning order corresponding to the prediction direction of the current block, where the scanning order is found by the finding unit.

It may be seen from the technical solutions provided by the embodiments of the present invention that, in the embodiments of the present invention, when a scanning order of the current block is being determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, coding performance is maintained while the scanning orders are decreased, and the system complexity of the codec system is reduced.

BRIEF DESCRIPTION OF THE DRAWINGS

To illustrate the technical solutions according to the embodiments of the present invention or in the prior art more clearly, the accompanying drawings required for describing the embodiments or the prior art are introduced briefly below. Apparently, the accompanying drawings in the following descriptions merely show some of the embodiments of the present invention, and persons skilled in the art may obtain other drawings according to the accompanying drawings without creative efforts.

DETAILED DESCRIPTION

The technical solutions of the present invention are to be clearly described in the following with reference to the accompanying drawings. It is obvious that the embodiments to be described are a part rather than all of the embodiments of the present invention. All other embodiments obtained by persons skilled in the art based on the embodiments of the present invention without creative efforts shall fall within the protection scope of the present invention.

In the embodiment of the present invention, a 4*4 sized block in the H.264 video compression standard (H.264 standard) is taken as an example to illustrate the embodiments of the present invention, and a processing procedure of blocks in other sizes is similar to the processing procedure of the 4*4 sized block, which is not described here again.

Figure 1:
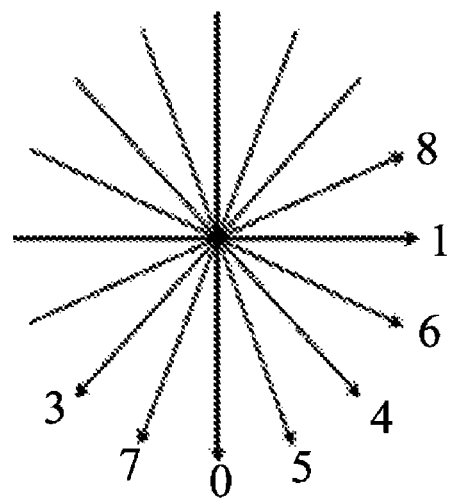
FIG. 1 is a schematic diagram of a prediction direction provided by an embodiment of the present invention.

FIG. 1 describes a prediction direction provided by an embodiment of the present invention, and prediction directions of a 4*4 sized block in the H.264 standard are described in the embodiment. As shown in FIG. 1, the 4*4 sized block has 8 prediction directions, plus a direct component (DC) prediction direction. In FIG. 1, a prediction direction 0, a prediction direction 1, a prediction direction 3, a prediction direction 4, a prediction direction 5, a prediction direction 6, a prediction direction 7, and a prediction direction 8 are marked. The DC prediction direction is not shown in the figure.

Geometric correlations and proximity relationships involved in the embodiments of the present invention are described through the prediction direction 0, the prediction direction 1, the prediction direction 3, the prediction direction 4, the prediction direction 5, the prediction direction 6, the prediction direction 7, and the prediction direction 8 in FIG. 1.

As shown in FIG. 1, the prediction direction 1 and the prediction direction 0 are in a transposition correlation; the prediction direction 6 and the prediction direction 8 are in a symmetric correlation along the prediction direction 1; the prediction direction 5 and the prediction direction 7 are in a symmetric correlation along the prediction direction 0; and the prediction direction 3 and the prediction direction 4 are in a symmetric correlation along the prediction direction 0.

After the geometric correlations are determined, the proximity relationships may be further determined on basis of the geometric correlations. As shown in FIG. 1, based on the reference to the geometric transposition correlation between the prediction direction 0 and the prediction direction 1, the prediction direction 6 and the prediction direction 8 form a proximity relationship with the prediction direction 1; and the prediction direction 5 and the prediction direction 7 form a proximity relationship with the prediction direction 0.

If the corresponding prediction directions are formed under the geometric correlations, due to the corresponding characteristic of prediction signal directions, scanning orders of the coefficient signals that have been transformed also have a similar corresponding correlation. Specifically, when two prediction directions are in a transposition correlation, scanning orders corresponding to the two prediction directions present a transposition relationship; and when two prediction directions are in a symmetric correlation, scanning orders corresponding to the two prediction directions present the same scanning order.

If the corresponding prediction directions are formed under the proximity relationships, due to an approximation characteristic of prediction signal directions, scanning orders of the coefficient signals that have been transformed also present a similar characteristic of approximation, and two coefficient signals corresponding to the two prediction directions under the proximity relationship may adopt the same scanning order.

Therefore, the prediction directions may be divided into groups in advance according to the foregoing geometric correlations and proximity relationships, where the prediction directions in the same group may use the same scanning order, that is, multiple prediction directions may share one scanning order.

In an embodiment of the present invention, according to the foregoing geometric correlations and proximity relationships, mapping relationship tables of the prediction direction and the scanning order shown in Table 1, Table 2, and Table 3 are formed for the 8 prediction directions marked in FIG. 1.

TABLE 1

| Prediction direction | Scanning order |
| --- | --- |
| Prediction directions 0 and 1 | Scanning order 1 (shared through a transposition relationship) |
| Prediction directions 3 and 4 | Scanning order 2 |
| Prediction directions 5, 6, 7, and 8 | Scanning order 3 (shared by prediction direction 5 and prediction direction 7 through a symmetric relationship, shared by prediction direction 6 and prediction direction 8 through a symmetric relationship, shared by prediction direction 5 and the prediction direction 7, as well as prediction direction 6 and prediction direction 8 through a transposition relationship) |

TABLE 2

| Prediction direction | Scanning order |
| --- | --- |
| Prediction directions 0, 1, 5, 6, 7, and 8 | Scanning order 1 (shared by prediction direction 1 and prediction direction 0 through a transposition relationship, shared by prediction direction 6 and prediction direction 8 with prediction direction 1 through a proximity relationship, shared by prediction direction 5 and prediction direction 7 with prediction direction 1 through a proximity relationship) |
| Prediction directions 3 and 4 | Scanning order 2 |

TABLE 3

| Prediction direction | Scanning order |
| --- | --- |
| Prediction directions 0, 1, 7, and 8 | Scanning order 1 (shared by prediction direction 1 and prediction direction 0 through a transposition relationship, shared by prediction direction 8 and prediction direction 0 through a proximity relationship, and shared by prediction relationship 7 and prediction direction 1 through a proximity relationship) |
| Prediction directions 3, 4, 5, and 6 | Scanning order 2 |

The scanning order 1, the scanning order 2, and the scanning order 3 in Table 1, Table 2, and Table 3 may be obtained through training by a training sample, and the scanning orders obtained by different training samples may be different.

Figure 2:
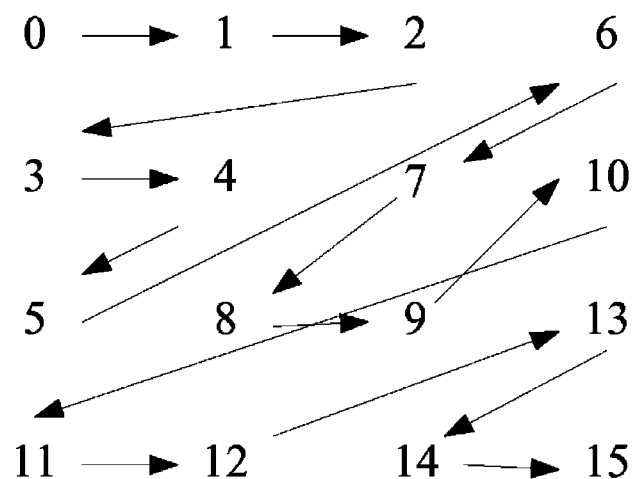
FIG. 2 is a schematic diagram of a prediction sequence 1 provided by an embodiment of the present invention.

FIG. 2 describes a scanning order 1 provided by an embodiment of the present invention, and as shown in FIG. 2, the scanning order 1 specifically is: a00→a01→a02→a10→a11→a20→a03→a12→a21→a22→a13→a30→a31→a23→a32→a33.

Where axy represents the (x, y) position of a two-dimensional array position a.

Figure 3:
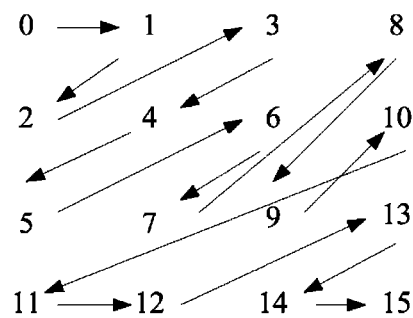
FIG. 3 is a schematic diagram of a prediction sequence 2 provided by another embodiment of the present invention.

FIG. 3 describes a scanning order 2 provided by an embodiment of the present invention, and as shown in FIG. 3, the scanning order 2 specifically is: a00→a01→a10→a02→a11→a20→a12→a21→a03→a22→a13→a30→a31→a23→a32→a33.

Figure 4:
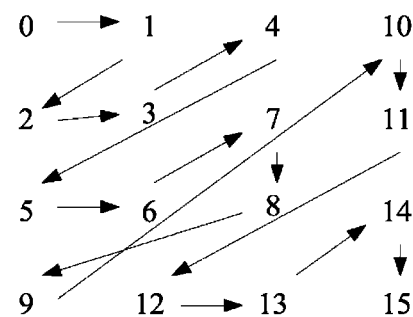
FIG. 4 is a schematic diagram of a prediction sequence 3 provided by another embodiment of the present invention.

FIG. 4 describes a scanning order 3 provided by an embodiment of the present invention, and as shown in FIG. 4, the scanning order 3 specifically is: a00→a01→a02→a11→a02→a20→a21→a12→a22→a30→a03→a13→a31→a32→a23→a33.

Figure 5:
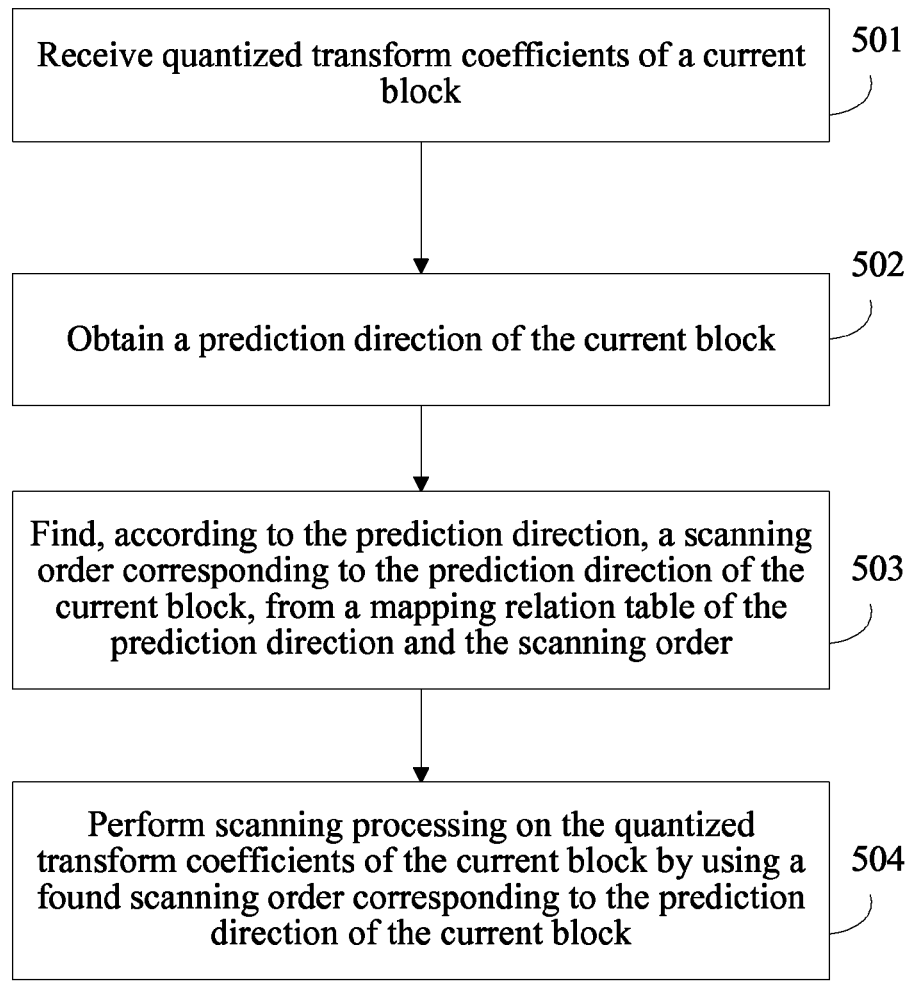
FIG. 5 describes a flow chart of a scanning method provided by an embodiment of the present invention.

The scanning method provided by an embodiment of the present invention is described in the following. FIG. 5 describes a flow of a scanning method provided by an embodiment of the present invention. Specifically, a processing flow of a scanning device in a coding apparatus may be described in the embodiment, and the embodiment includes the following steps:

501: Receive quantized transformed coefficients of a current block.

Specifically, quantized transformed coefficients output by a transform device in the coding apparatus are received, and the quantized transformed coefficients specifically are two-dimensional data.

502: Obtain a prediction direction of the current block.

The prediction direction of the current block may be directly sent to the scanning device by the prediction device in the coding apparatus; and may be sent to the transform device by the prediction device, and then sent to the scanning device by the transform device.

503: Find, according to the prediction direction, a scanning order corresponding to the prediction direction of the current block, from a mapping relationship table of the prediction direction and the scanning order, where at least one scanning order in the mapping relationship table of the prediction direction and the scanning order corresponds to at least two prediction directions.

The at least two prediction directions may have a geometric correlation and/or a proximity relationship. In an embodiment of the present invention, a geometric correlation of two prediction directions in the at least two prediction directions is a transposition correlation. In another embodiment of the present invention, a geometric correlation of two prediction directions in the at least two prediction directions is a symmetric correlation along a reference prediction direction. The reference prediction direction may be a horizontal direction or a vertical direction. As shown in FIG. 1, the reference prediction direction may be a prediction direction 1 which is a horizontal direction, and may be a prediction direction 0 which is a vertical direction.

504: Perform scanning processing on the quantized transformed coefficients of the current block by using a found scanning order corresponding to the prediction direction of the current block.

Specifically, one-dimensional data is obtained through the scanning processing.

It may be seen from the above that, in this embodiment, when a scanning order of the current block is being determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, coding performance is maintained while the scanning orders are decreased, and system complexity of a coding system is reduced.

Figure 6:
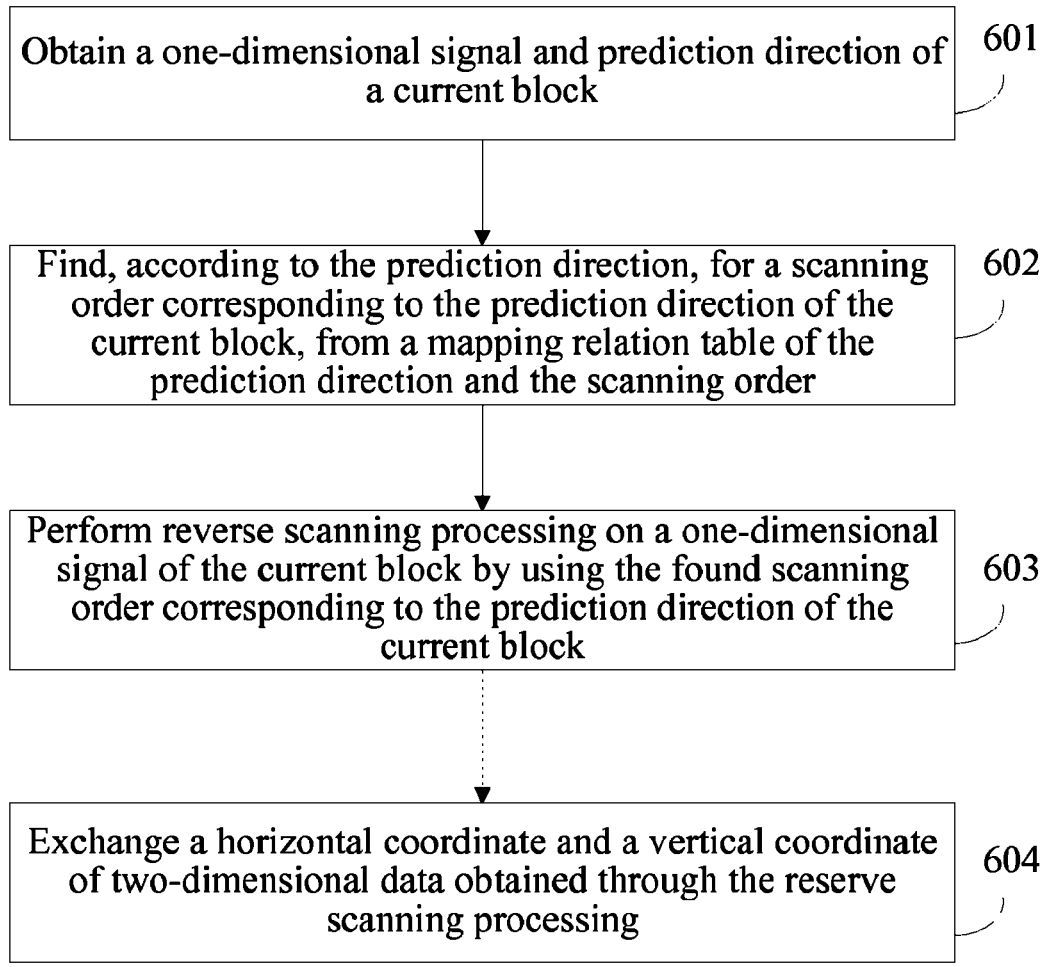
FIG. 6 describes a flow chart of a reverse scanning method provided by an embodiment of the present invention.

A reverse scanning method provided by an embodiment of the present invention is further described. FIG. 6 describes a flow of a reverse scanning method provided by an embodiment of the present invention. Specifically, the processing flow of a reverse scanning device in a decoding apparatus may be described in the embodiment, and the embodiment includes the following steps:

601: Obtain a one-dimensional signal and prediction direction of a current block, where the one-dimensional signal and prediction direction of the current block are obtained through entropy decoding.

602: Find, according to the prediction direction, a scanning order corresponding to the prediction direction of the current block, from a mapping relationship table of the prediction direction and the scanning order, where at least one scanning order in the mapping relationship table of the prediction direction and the scanning order corresponds to at least two prediction directions.

The at least two prediction directions may have a geometric correlation and/or a proximity relationship. In an embodiment of the present invention, a geometric correlation of two prediction directions in the at least two prediction directions is a transposition correlation. In another embodiment of the present invention, a geometric correlation of two prediction directions in the at least two prediction directions is a symmetric correlation along a reference prediction direction. The reference prediction direction may be a horizontal direction or a vertical direction. As shown in FIG. 1, the reference prediction direction may be a prediction direction 1 which is a horizontal direction, and may be a prediction direction 0 which is a vertical direction.

In an embodiment of the present invention, when a geometric correlation of two prediction directions is a transposition correlation, the two prediction directions may correspond to two scanning orders.

603: Perform reverse scanning processing on the one-dimensional signal of the current block by using the found scanning order corresponding to the prediction direction of the current block.

Two-dimensional data is obtained through the reserve scanning processing.

In another embodiment of the present invention, a geometric correlation of two prediction directions may be a transposition correlation, and the two prediction directions may only correspond to one scanning order. At this time, a scanning order corresponding to the first prediction direction in the two prediction directions may be stored in the mapping relationship table of the prediction direction and the scanning order. When the prediction direction of the current block is the first prediction direction, the two-dimensional data obtained through performing reserve scanning processing on the one-dimensional signal of the current block may be directly output for reserve transform processing; and when the prediction direction of the current block is the second prediction direction in the two prediction directions, the reverse scanning method provided by the embodiment may further include the following step:

604: Exchange a horizontal coordinate and a vertical coordinate of the two-dimensional data obtained through the reserve scanning processing.

That is, the coordinate (x, y) of the obtained two-dimensional data is changed to (y, x), so as to obtain correct data.

It may be seen from the above that, in this embodiment, when a scanning order of the current block is being determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the number of the scanning orders is decreased, and the system complexity of a decoding system is reduced. Meanwhile, in another embodiment of the present invention, when the geometric correlation of two prediction directions is the transposition correlation, the two prediction directions may only correspond to one scanning order, and a correct reverse scanning output result may be obtained through changing the coordinate (x, y), which is output in scanning, to (y, x). With this operation, the number of the scanning orders may be further decreased, and the system complexity of the decoding system is further reduced.

In the following, a 4*4 sized image block is taken as an example to illustrate a reverse scanning method provided by an embodiment of the present invention. In a reverse scanning process, input data are 16 transform coefficients after entropy decoding of a current 4*4 block and the prediction direction of the current block that are obtained through entropy decoding; output data is a two-dimensional array a, where each value corresponds to an amplitude of each frequency of the current 4*4 block.

The mapping relationship table of the prediction direction and the scanning order described in Table 1 is taken as an example, and the mapping relationship between the prediction direction and a specific scanning order provided by an embodiment of the present invention is shown in Table 4.

TABLE 4

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0, 1 | $a_{00}$ | $a_{01}$ | $a_{02}$ | $a_{10}$ | $a_{11}$ | $a_{20}$ | $a_{03}$ | $a_{12}$ | $a_{21}$ | $a_{22}$ | $a_{13}$ | $a_{30}$ | $a_{31}$ | $a_{23}$ | $a_{32}$ | $a_{33}$ |
| 3, 4 | $a_{00}$ | $a_{01}$ | $a_{10}$ | $a_{02}$ | $a_{11}$ | $a_{20}$ | $a_{12}$ | $a_{21}$ | $a_{03}$ | $a_{22}$ | $a_{13}$ | $a_{30}$ | $a_{31}$ | $a_{23}$ | $a_{32}$ | $a_{33}$ |
| 5, 6, 7, 8 | $a_{00}$ | $a_{01}$ | $a_{02}$ | $a_{11}$ | $a_{02}$ | $a_{20}$ | $a_{21}$ | $a_{12}$ | $a_{22}$ | $a_{30}$ | $a_{03}$ | $a_{13}$ | $a_{31}$ | $a_{32}$ | $a_{23}$ | $a_{33}$ |

In Table 4, Idx is an index value of the prediction direction, and axy represents (x, y) position of the two-dimensional array position a.

During reverse scanning, the scanning order corresponding to the current prediction direction may be found according to the table of the prediction direction and the scanning order shown in Table 4, and reverse scanning is performed on the currently input transform coefficients by using the found scanning order, so that the amplitudes of one-dimensional transform coefficients are corresponding to specific positions in the two-dimensional array.

For the prediction directions 0 and 1, a scanning order corresponding to the prediction direction 0 is stored in Table 4. Therefore, when reverse scanning is performed by using the corresponding scanning order in Table 4, if the prediction direction is 0, a scanning output result may be directly obtained; if the prediction direction is 1, the correlation between each corresponding scanned position and the two-dimensional array is the transposition relationship, and an obtained coordinate (x, y) needs to be changed to (y, x) to obtain the scanning output result. Through adding a simple exchanging module, a unit for storing scanning table or updating scanning table is saved, so that the system complexity of the codec system is further reduced.

For prediction directions 3, 4, 5, 6, 7, and 8, the value of (x, y) may be obtained through reverse scanning by using the corresponding scanning order in Table 4, so as to obtain the output result a, which is not described here again.

It may be seen from the above that, in this embodiment, when a scanning order of the current block is determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the scanning orders are decreased, and the system complexity of a coding system is reduced.

Further, the mapping relationship table of the prediction direction and the scanning order described in Table 1 is taken as an example. A mapping relationship between the prediction direction and a specific scanning order provided by another embodiment of the present invention is shown in Table 5.

TABLE 5

| Idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | $a_{00}$ | $a_{01}$ | $a_{02}$ | $a_{10}$ | $a_{11}$ | $a_{20}$ | $a_{03}$ | $a_{12}$ | $a_{21}$ | $a_{22}$ | $a_{13}$ | $a_{30}$ | $a_{31}$ | $a_{23}$ | $a_{32}$ | $a_{33}$ |
| 1 | $a_{00}$ | $a_{10}$ | $a_{20}$ | $a_{01}$ | $a_{11}$ | $a_{02}$ | $a_{30}$ | $a_{21}$ | $a_{12}$ | $a_{22}$ | $a_{31}$ | $a_{03}$ | $a_{13}$ | $a_{32}$ | $a_{23}$ | $a_{33}$ |
| 3, 4 | $a_{00}$ | $a_{01}$ | $a_{10}$ | $a_{02}$ | $a_{11}$ | $a_{20}$ | $a_{12}$ | $a_{21}$ | $a_{03}$ | $a_{22}$ | $a_{13}$ | $a_{30}$ | $a_{31}$ | $a_{23}$ | $a_{32}$ | $a_{33}$ |
| 5, 6, 7, 8 | $a_{00}$ | $a_{01}$ | $a_{02}$ | $a_{11}$ | $a_{02}$ | $a_{20}$ | $a_{21}$ | $a_{12}$ | $a_{22}$ | $a_{30}$ | $a_{03}$ | $a_{13}$ | $a_{31}$ | $a_{32}$ | $a_{23}$ | $a_{33}$ |

In Table 5, Idx is an index value of the prediction direction, and axy represents (x, y) position of a two-dimensional array position a.

During reverse scanning, the scanning order corresponding to the current prediction direction may be found according to the table of the prediction direction and the scanning order shown in Table 5. The reverse scanning is performed on the currently input transform coefficients by using the found scanning order, so that amplitudes of one-dimensional transform coefficients are corresponding to specific positions in the two-dimensional array.

For the prediction directions 0 and 1, the scanning orders of the prediction direction 0 and the prediction direction 1 are separately stored in Table 5. Therefore, when reverse scanning is performed by using the corresponding scanning order in Table 5, if the prediction direction is 0, a scanning output result may be directly obtained; if the prediction direction is 1, a scanning output result may also be obtained. Unlike the mapping relationship between the prediction direction and the specific scanning order described in Table 4, the scanning output result may be obtained without changing the obtained coordinate (x, y) to (y, x) when the prediction direction is 1.

For prediction directions 3, 4, 5, 6, 7, and 8, the value of (x, y) may be obtained through reverse scanning by using the corresponding scanning order in Table 5, so as to obtain an output result a, which is not described here again.

It may be seen from the above that, in this embodiment, when a scanning order of the current block is determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the scanning orders are decreased, and the system complexity of a coding system is reduced.

Figure 7:
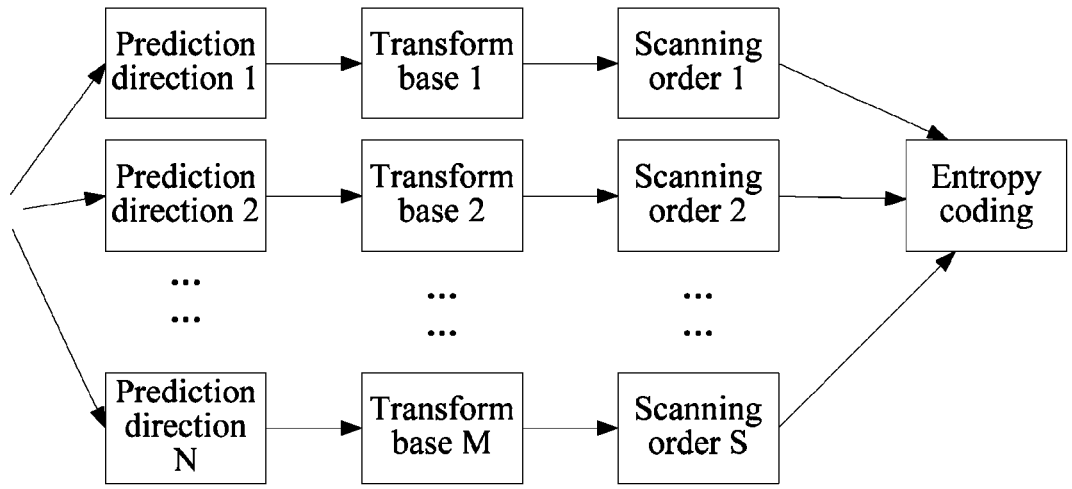
FIG. 7 describes a signaling flow chart of a coding method provided by an embodiment of the present invention.

FIG. 7 is a signaling flow chart of a coding method provided by an embodiment of the present invention, and as shown in FIG. 7:

First, a prediction device selects, according to the characteristic of the current block, a prediction direction from a prediction direction 1, a prediction direction 2, . . . , and a prediction direction prediction N, to perform prediction on the current block.

Next, the transform device performs transform quantizing processing on data obtained through the prediction processing.

In an embodiment of the present invention, if transform bases, which are used in the transform quantizing processing, and the prediction directions are in one-to-one mapping, the data obtained through the prediction processing may be directly output to a corresponding transform base for transform quantizing processing.

In another embodiment of the present invention, the number of the transform bases used in the transform quantizing processing is smaller than the number of the prediction directions. In this case, it is required that multiple prediction directions use the same transform base. Therefore, the transform device may maintain the mapping relationship between the prediction direction and the transform base, and directly find the corresponding transform base according to the mapping relationship between the prediction direction and the transform base to perform the transform quantizing processing. That is, a transform base is selected from a transform base 1, a transform base 2, . . . , and a transform base M.

In another embodiment of the present invention, the number of the transform base is 1.

Next, the scanning device performs scanning processing on the data that has undergone the transform quantizing processing.

In an embodiment of the present invention, the transform bases, which correspond to the prediction directions, and the scanning orders are in one-to-one mapping, that is, the number of the transform bases and the number of the scanning orders are the same. In this case, the scanning processing may be directly performed on the data, which has undergone the transform quantizing processing, according to the corresponding scanning order. In this case, the number of the prediction directions is larger than the number of the transform bases, and the number of the transform bases is equal to the number of the scanning orders.

In another embodiment of the present invention, the scanning device, after obtaining the data that has undergone the transform quantizing processing, further needs to obtain the prediction direction, find the corresponding scanning order from the mapping relationship between the prediction direction and the scanning order, and perform scanning processing according to the found scanning order. That is, a scanning order is selected from a scanning order 1, a scanning order 2, . . . , and a scanning order S. At this time, the number of the prediction directions is larger than the number of the transform bases, and the number of the prediction directions is larger than the number of the scanning orders, where N>M, N>S.

In the end, an entropy coding device performs entropy coding on the data that has undergone the scanning processing.

It may be seen from the above that, in this embodiment, when a scanning order of the current block is being determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the scanning orders are decreased, and the system complexity of a coding system is reduced.

Figure 8:
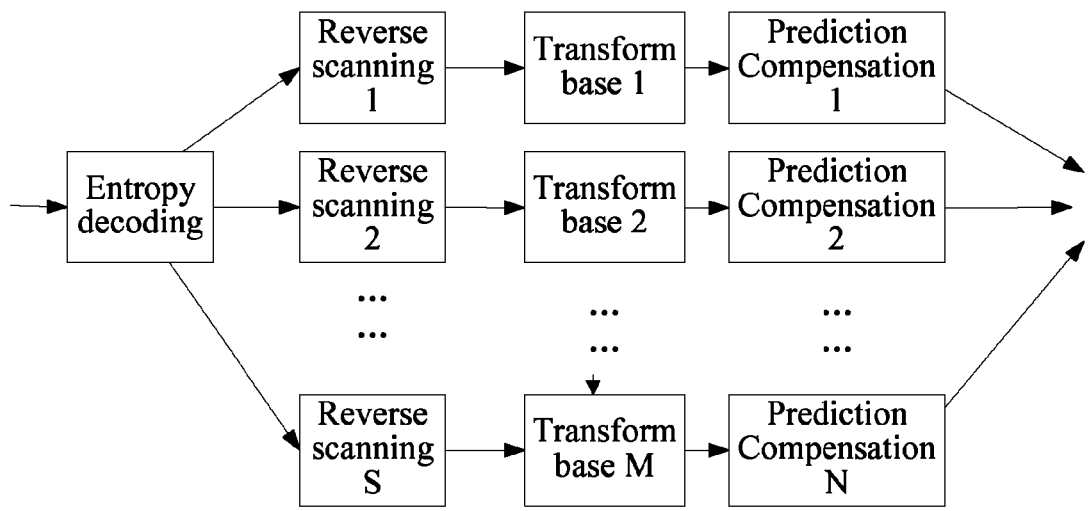
FIG. 8 describes a signaling flow chart of a decoding method provided by an embodiment of the present invention.

FIG. 8 describes a signaling flow chart of a decoding method provided by an embodiment of the present invention, and as shown in FIG. 8:

First, an entropy decoding device obtains one-dimensional data and a prediction direction through decoding.

Next, a reverse scanning device finds, according to the prediction direction, a corresponding scanning order from a mapping relationship between the prediction direction and the scanning order, and performs reserve scanning processing according to the found scanning order. That is, a scanning order is selected from a scanning order 1, a scanning order 2, . . . , and a scanning order S.

Next, the reverse transform device performs reverse transform processing on data obtained through reverse scanning. In an embodiment of the present invention, the reverse scanning device may select a transform base from a reserve transform base 1, a reserve transform base 2, . . . , a reserve transform base M according to the prediction direction to perform reserve transform processing.

In the end, a prediction compensation unit selects a prediction compensation direction from a prediction compensation direction 1, a prediction compensation direction 2, . . . , and a prediction compensation direction N to perform prediction compensation processing, where N>M, N>S.

It may be seen from the above that, in this embodiment, when a scanning order of the current block is determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the scanning orders are decreased, and the system complexity of a coding system is reduced.

It should be noted that, as for the foregoing method embodiments, for simple description, the methods are described as a series of action combination, but persons skilled in the art should know that, the present invention is not limited by the described action sequence, and according to the present invention, some steps may be performed in other sequences or performed simultaneously. Next, persons skilled in the art should also know that, the embodiments described in the specification are exemplary embodiments, and involved actions and devices are not necessarily indispensable to the present invention.

Figure 9:
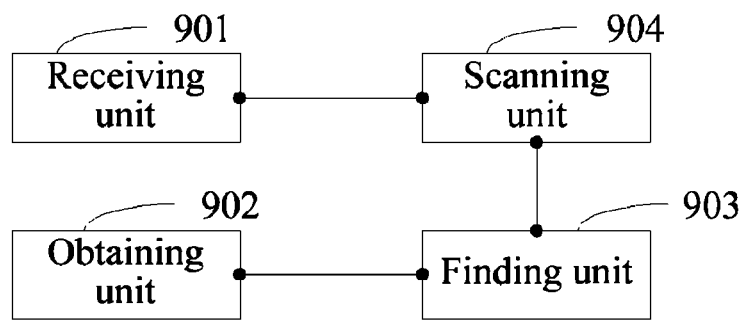
FIG. 9 describes a structural diagram of a scanning device provided by an embodiment of the present invention.

A scanning device provided by an embodiment of the present invention is further described. FIG. 9 describes a structure of a scanning device provided by an embodiment of the present invention. The scanning device of the embodiment may include: a receiving unit 901, an obtaining unit 902, a finding unit 903 and a scanning unit 904.

The receiving unit 901 is configured to receive quantized transformed coefficients of a current block.

The obtaining unit 902 is configured to obtain a prediction direction of the current block.

The finding unit 903 is configured to find, according to the prediction direction obtained by the obtaining unit 902, a scanning order corresponding to the prediction direction of the current block, from a mapping relationship table of the prediction direction and the scanning order, where at least one scanning order in the mapping relationship table of the prediction direction and the scanning order corresponds to at least two prediction directions.

The scanning unit 904 is configured to perform scanning processing on the coefficients, which are received by the receiving unit 901, by using the scanning order corresponding to the prediction direction of the current block, where the scanning order is found by the finding unit 903.

It may be seen from the above that, in this embodiment, when a scanning order of the current block is determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the scanning orders are decreased, and the system complexity of a coding system is reduced.

Figure 10:
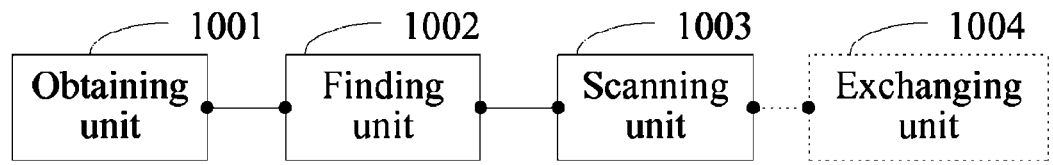
FIG. 10 describes a structural diagram of a reverse scanning device provided by an embodiment of the present invention.

FIG. 10 describes a structure of a reverse scanning device provided by an embodiment of the present invention. The reverse scanning device in the embodiment may include: an obtaining unit 1001, a finding unit 1002, and a reverse scanning unit 1003.

The obtaining unit 1001 is configured to obtain a one-dimensional signal and prediction direction of a current block, where the one-dimensional signal and prediction direction of the current block are obtained through entropy decoding.

The finding unit 1002 is configured to find, according to the prediction direction obtained by the obtaining unit 1001, a scanning order corresponding to the prediction direction of the current block, from a mapping relationship table of the prediction direction and the scanning order, where at least one scanning order in the mapping relationship table of the prediction direction and the scanning order corresponds to at least two prediction directions.

The reverse scanning unit 1003 is configured to perform reverse scanning processing on the one-dimensional signal, which is obtained by the obtaining unit 1001, by using the scanning order corresponding to the prediction direction of the current block, where the scanning order is found by the finding unit 1002.

In another embodiment of the present invention, the scanning order corresponding to a first prediction direction in two prediction directions having a transposition correlation is stored in the mapping relationship table of the prediction direction and the scanning order, and the prediction direction of the current block obtained by the obtaining unit 1001 is the first prediction direction in the two prediction directions having the transposition correlation; the reverse scanning device may further include: an exchanging unit 1004 configured to exchange a horizontal coordinate and a vertical coordinate of two-dimensional data obtained by the reserve scanning unit 1003.

It may be seen from the above that, in this embodiment, when a scanning order of the current block is being determined, the scanning order corresponding to the prediction direction of the current block may be found from the mapping relationship table of the prediction direction and the scanning order, and at least one scanning order in the mapping relationship table of the prediction direction and the scanning order corresponds to at least two prediction directions, that is, the number of the scanning orders is smaller than the number of the prediction directions. Therefore, the coding performance is maintained while the number of the scanning orders is decreased, and the system complexity of a decoding system is reduced. Meanwhile, in another embodiment of the present invention, when the geometric correlation of two prediction directions is a transposition correlation, the two prediction directions may only correspond to one scanning order, so that the number of the scanning orders is further decreased, and the system complexity of the decoding system is further reduced.

Because the content such as information interaction and execution processes between the above device and each device in the system are based on the same conception as the method embodiment of the present invention, for specific content, reference may be made to the description in the method embodiment of the present invention, which is not described here again.

Persons skilled in the art should understand that, all or a part of processes in the method according to the embodiments may be accomplished by relevant hardware under instructions of a computer program. The program may be stored in a computer-readable storage medium. When the program is executed, the process of the method according to the embodiments of the present invention is performed. The storage medium may be a magnetic disk, an optical disk, a read-only memory (ROM), a random access memory (RAM), and the like.

Specific cases are used for illustrating principles and implementation manners of the present invention. The descriptions of the embodiments are merely for better understanding the method and core ideas of the present invention. Meanwhile, persons skilled in the art may make modifications to specific implementation manners and application ranges according to the ideas of the present invention. In conclusion, the content of the specification shall not be construed as a limitation to the present invention.

What is claimed is:

1. A scanning method comprising:
receiving a quantized transformed coefficient of a current block;
obtaining a first prediction direction of the current block;
determining a first scanning order using a mapping relationship table, wherein the mapping relationship table comprises the first prediction direction, a second prediction direction, a third prediction direction, a fourth prediction direction, the first scanning order, and a second scanning order, wherein the mapping relationship table indicates that the first scanning order is to be used with the first prediction direction and the second prediction direction, wherein the mapping relationship table indicates that the second scanning order is to be used with the third prediction direction and the fourth prediction direction, wherein the first prediction direction, the second prediction direction, the third prediction direction, and the fourth prediction direction are all different from one another, and wherein the first scanning order is different from the second scanning order, wherein the first scanning order comprises $a_{00} \rightarrow a_{01} \rightarrow a_{02} \rightarrow a_{10} \rightarrow a_{11} \rightarrow a_{20} \rightarrow a_{03} \rightarrow a_{12} \rightarrow a_{21} \rightarrow a_{22} \rightarrow a_{13} \rightarrow a_{30} \rightarrow a_{31} \rightarrow a_{23} \rightarrow a_{32} \rightarrow a_{33}$ or $a_{00} \rightarrow a_{01} \rightarrow a_{10} \rightarrow a_{02} \rightarrow a_{11} \rightarrow a_{20} \rightarrow a_{12} \rightarrow a_{21} \rightarrow a_{03} \rightarrow a_{22} \rightarrow a_{13} \rightarrow a_{30} \rightarrow a_{31} \rightarrow a_{23} \rightarrow a_{32} \rightarrow a_{33}$ or $a_{00} \rightarrow a_{01} \rightarrow a_{02} \rightarrow a_{11} \rightarrow a_{02} \rightarrow a_{20} \rightarrow a_{21} \rightarrow a_{12} \rightarrow a_{22} \rightarrow a_{30} \rightarrow a_{03} \rightarrow a_{13} \rightarrow a_{31} \rightarrow a_{32} \rightarrow a_{23} \rightarrow a_{33}$, and wherein $a_{xy}$ represents (x, y) position of a two-dimensional array a; and
performing scanning processing on the coefficient using the first scanning order corresponding to the first prediction direction of the current block.

2. The scanning method according to claim 1, wherein the third prediction direction and the fourth prediction direction are in a first symmetric correlation.

3. The scanning method according to claim 1, wherein the first prediction direction and the second prediction direction are in a transposition correlation.

4. The scanning method according to claim 3, wherein the mapping relationship table further comprises a fifth prediction direction, a sixth prediction direction, a seventh prediction direction, an eighth prediction direction, and a third scanning order, wherein the first prediction direction, the second prediction direction, the third prediction direction, the fourth prediction direction, the fifth prediction direction, the sixth prediction direction, the seventh prediction direction, and the eighth prediction direction are all different from one another, wherein the first scanning order, the second scanning order, and the third scanning order are different from one another, wherein the mapping relationship table indicates that the third scanning order is to be used with the fifth prediction direction, the sixth prediction direction, the seventh prediction direction, and the eighth prediction direction, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

5. The scanning method according to claim 3, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the first scanning order is to be used with the fifth prediction direction, the sixth prediction direction, the seventh prediction direction, and the eighth prediction direction, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

6. The scanning method according to claim 3, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the second scanning order is to be used with the fifth prediction direction and the sixth prediction direction, wherein the mapping relationship table indicates that the first scanning order is to be used with the seventh prediction direction and the eighth prediction direction, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

7. A reverse scanning method comprising:
   obtaining a one-dimensional signal and a first prediction direction of a current block, wherein the one-dimensional signal and the first prediction direction of the current block are obtained through entropy decoding;
   determining a first scanning order using a mapping relationship table, wherein the mapping relationship table comprises the first prediction direction, a second prediction direction, a third prediction direction, a fourth prediction direction, the first scanning order, and a second scanning order, wherein the mapping relationship table indicates that the first scanning order is to be used with the first prediction direction and the second prediction direction, wherein the mapping relationship table indicates that the second scanning order is to be used with the third prediction direction and the fourth prediction direction, wherein the first prediction direction, the second prediction direction, the third prediction direction, and the fourth prediction direction are all different from one another, and wherein the first scanning order is different from the second scanning order, wherein the first scanning order comprises $a_{00} \rightarrow a_{01} \rightarrow a_{02} \rightarrow a_{10} \rightarrow a_{11} \rightarrow a_{20} \rightarrow a_{03} \rightarrow a_{12} \rightarrow a_{21} \rightarrow a_{22} \rightarrow a_{13} \rightarrow a_{30} \rightarrow a_{31} \rightarrow a_{23} \rightarrow a_{32} \rightarrow a_{33}$ or $a_{00} \rightarrow a_{01} \rightarrow a_{10} \rightarrow a_{02} \rightarrow a_{11} \rightarrow a_{20} \rightarrow a_{12} \rightarrow a_{21} \rightarrow a_{03} \rightarrow a_{22} \rightarrow a_{13} \rightarrow a_{30} \rightarrow a_{31} \rightarrow a_{23} \rightarrow a_{32} \rightarrow a_{33}$ or $a_{00} \rightarrow a_{01} \rightarrow a_{02} \rightarrow a_{11} \rightarrow a_{02} \rightarrow a_{20} \rightarrow a_{21} \rightarrow a_{12} \rightarrow a_{22} \rightarrow a_{30} \rightarrow a_{03} \rightarrow a_{13} \rightarrow a_{31} \rightarrow a_{32} \rightarrow a_{23} \rightarrow a_{33}$, and wherein $a_{xy}$ represents (x, y) position of a two-dimensional array a; and
   performing reverse scanning processing on the one-dimensional signal using the first scanning order corresponding to the first prediction direction of the current block.

8. The scanning method according to claim 7, wherein the first prediction direction and the second prediction direction are in a transposition correlation, and wherein performing the reverse scanning processing on the one-dimensional signal using the scanning order corresponding to the first prediction direction of the current block further comprises exchanging a horizontal coordinate and a vertical coordinate of two-dimensional data obtained through the reserve scanning processing.

9. The reverse scanning method according to claim 7, wherein the mapping relationship table further comprises a fifth prediction direction, a sixth prediction direction, a seventh prediction direction, an eighth prediction direction, and a third scanning order, wherein the first prediction direction, the second prediction direction, the third prediction direction, the fourth prediction direction, the fifth prediction direction, the sixth prediction direction, the seventh prediction direction, and the eighth prediction direction are all different from one another, wherein the first scanning order, the second scanning order, and the third scanning order are different from one another, and wherein the mapping relationship table indicates that the third scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

10. The reverse scanning method according to claim 7, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the first scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

11. The reverse scanning method according to claim 7, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the second scanning order is to be used with the fifth prediction direction and the sixth prediction direction, wherein the mapping relationship table indicates that the first scanning order is to be used with the seventh prediction direction and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

12. A scanning device comprising:
   a receiving unit configured to receive a quantized transformed coefficient of a current block;
   an obtaining unit configured to obtain a first prediction direction of the current block;

a finding unit configured to determine a first scanning order using a mapping relationship table, wherein the mapping relationship table comprises the first prediction direction, a second prediction direction, a third prediction direction, a fourth prediction direction, the first scanning order, and a second scanning order, wherein the mapping relationship table indicates that the first scanning order is to be used with the first prediction direction and the second prediction direction, wherein the mapping relationship table indicates that the second scanning order is to be used with the third prediction direction and the fourth prediction direction, wherein the first prediction direction, the second prediction direction, the third prediction direction, and the fourth prediction direction are all different from one another, and wherein the first scanning order is different from the second scanning order, wherein the first scanning order comprises $a_{00} \to a_{01} \to a_{02} \to a_{10} \to a_{11} \to a_{20} \to a_{03} \to a_{12} \to a_{21} \to a_{22} \to a_{13} \to a_{30} \to a_{31} \to a_{23} \to a_{32} \to a_{33}$ or $a_{00} \to a_{01} \to a_{10} \to a_{02} \to a_{11} \to a_{20} \to a_{12} \to a_{21} \to a_{03} \to a_{22} \to a_{13} \to a_{30} \to a_{31} \to a_{23} \to a_{32} \to a_{33}$ or $a_{00} \to a_{01} \to a_{02} \to a_{11} \to a_{02} \to a_{20} \to a_{21} \to a_{12} \to a_{22} \to a_{30} \to a_{03} \to a_{13} \to a_{31} \to a_{32} \to a_{23} \to a_{33}$, and wherein $a_{xy}$ represents (x, y) position of a two-dimensional array a; and a scanning unit configured to perform scanning processing on the coefficient received by the receiving unit using the first scanning order corresponding to the first prediction direction of the current block, wherein the first scanning order is found by the finding unit.

13. The scanning device according to claim 12, wherein the mapping relationship table further comprises a fifth prediction direction, a sixth prediction direction, a seventh prediction direction, an eighth prediction direction, and a third scanning order, wherein the first prediction direction, the second prediction direction, the third prediction direction, the fourth prediction direction, the fifth prediction direction, the sixth prediction direction, the seventh prediction direction, and the eighth prediction direction are all different from one another, wherein the first scanning order, the second scanning order, and the third scanning order are different from one another, and wherein the mapping relationship table indicates that the third scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

14. The scanning device according to claim 12, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the first scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

15. The scanning device according to claim 12, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the second scanning order is to be used with the fifth prediction direction and the sixth prediction direction, wherein the mapping relationship table indicates that the first scanning order is to be used with the seventh prediction direction and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

16. A reverse scanning device comprising:
an obtaining unit configured to obtain a one-dimensional signal and a first prediction direction of a current block, wherein the one-dimensional signal and the first prediction direction of the current block are obtained through entropy decoding;

a finding unit configured to determine a first scanning order using a mapping relationship table, wherein the mapping relationship table comprises the first prediction direction, a second prediction direction, a third prediction direction, a fourth prediction direction, the first scanning order, and a second scanning order, wherein the mapping relationship table indicates that the first scanning order is to be used with the first prediction direction and the second prediction direction, wherein the mapping relationship table indicates that the second scanning order is to be used with the third prediction direction and the fourth prediction direction, wherein the first prediction direction, the second prediction direction, the third prediction direction, and the fourth prediction direction are all different from one another, and wherein the first scanning order is different from the second scanning order, wherein the scanning order comprises $a_{00} \to a_{01} \to a_{02} \to a_{10} \to a_{11} \to a_{20} \to a_{03} \to a_{12} \to a_{21} \to a_{22} \to a_{13} \to a_{30} \to a_{31} \to a_{23} \to a_{32} \to a_{33}$ or $a_{00} \to a_{01} \to a_{10} \to a_{02} \to a_{11} \to a_{20} \to a_{12} \to a_{21} \to a_{03} \to a_{22} \to a_{13} \to a_{30} \to a_{31} \to a_{23} \to a_{32} \to a_{33}$ or $a_{00} \to a_{01} \to a_{02} \to a_{11} \to a_{02} \to a_{20} \to a_{21} \to a_{12} \to a_{22} \to a_{30} \to a_{03} \to a_{13} \to a_{31} \to a_{32} \to a_{23} \to a_{33}$, and wherein $a_{xy}$ represents (x, y) position of a two-dimensional array a; and a reverse scanning unit configured to perform reverse scanning processing on a one-dimensional signal obtained by the obtaining unit using the first scanning order corresponding to the first prediction direction of the current block, wherein the first scanning order is found by the finding unit.

17. The reverse scanning device according to claim 16, wherein the first prediction direction and the second prediction direction are in a transposition correlation, and wherein the reverse scanning device further comprises an exchanging unit configured to exchange a horizontal coordinate and a vertical coordinate of two-dimensional data obtained by the reverse scanning unit.

18. The reverse scanning device according to claim 16, wherein the mapping relationship table further comprises a fifth prediction direction, a sixth prediction direction, a seventh prediction direction, an eighth prediction direction, and a third scanning order, wherein the first prediction direction, the second prediction direction, the third prediction direction, the fourth prediction direction, the fifth prediction direction, the sixth prediction direction, the seventh prediction direction, and the eighth prediction direction are all different from one another, wherein the first scanning order, the second scanning order, and the third scanning order are different from one another, and wherein the mapping relationship table indicates that the third scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, wherein the seventh prediction direction and the eighth prediction direction are in a fourth symmetric correlation, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

19. The reverse scanning device according to claim 16, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the first scanning order is to be used with the fifth prediction direction, the sixth prediction direction, the seventh prediction direction, and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

20. The reverse scanning device according to claim 16, wherein the mapping relationship table further comprises a fifth prediction direction, a sixth prediction direction, a seventh prediction direction, and an eighth prediction direction, wherein the first prediction direction, the second prediction direction, the third prediction direction, the fourth prediction direction, the fifth prediction direction, the sixth prediction direction, the seventh prediction direction, and the eighth prediction direction are all different from one another, wherein the mapping relationship table indicates that the second scanning order is to be used with the fifth prediction direction and the sixth prediction direction, wherein the mapping relationship table indicates that the first scanning order is to be used with the seventh prediction direction and the eighth prediction direction, wherein the first prediction direction and the second prediction direction are in a transposition correlation, wherein the third prediction direction and the fourth prediction direction are in a first symmetric correlation, wherein the third prediction direction and the fourth prediction direction are in a second symmetric correlation, wherein the fifth prediction direction and the sixth prediction direction are in a third symmetric correlation, and wherein the seventh prediction direction and the eighth prediction direction are in a fourth symmetric correlation.

* * * * *